(12) United States Patent
Leung et al.

(10) Patent No.: US 11,325,274 B1
(45) Date of Patent: May 10, 2022

(54) FOOD SLICING DISC WITH ADJUSTABLE VERTICAL AND HORIZONTAL BLADES

(71) Applicant: CONAIR CORPORATION, Stamford, CT (US)

(72) Inventors: Anthony Kit Lun Leung, North Point (HK); Kin Man Lai, New Territories (HK)

(73) Assignee: CONAIR LLC, Stamford, CT (US)

( * ) Notice: Subject to any disclaimer, the term of this patent is extended or adjusted under 35 U.S.C. 154(b) by 0 days.

(21) Appl. No.: 17/116,741

(22) Filed: Dec. 9, 2020

(51) Int. Cl.
| B26D 3/22 | (2006.01) |
| B26D 1/29 | (2006.01) |
| B26D 1/00 | (2006.01) |
| B26D 1/03 | (2006.01) |
| A47J 43/25 | (2006.01) |
| B26D 7/26 | (2006.01) |

(52) U.S. Cl.
CPC .............. *B26D 3/225* (2013.01); *A47J 43/25* (2013.01); *B26D 1/0006* (2013.01); *B26D 1/03* (2013.01); *B26D 1/29* (2013.01); *B26D 7/2614* (2013.01); *B26D 2001/0046* (2013.01); *B26D 2001/0053* (2013.01); *B26D 2210/02* (2013.01)

(58) Field of Classification Search
CPC ........ B26D 3/225; B26D 1/0006; B26D 1/03; B26D 1/29; B26D 7/2614; B26D 2001/0046; B26D 2001/0053; B26D 2210/00; A47J 43/25
See application file for complete search history.

(56) References Cited

U.S. PATENT DOCUMENTS

| 1,094,604 | A | | 4/1914 | Shibata | |
| 2,715,927 | A | * | 8/1955 | Cupper | B26D 3/22 |
| | | | | | 269/54.4 |
| 2,834,386 | A | | 5/1958 | Heininger | |
| 3,783,727 | A | * | 1/1974 | Brignard | B26D 3/18 |
| | | | | | 83/592 |
| 4,198,887 | A | * | 4/1980 | Williams, Jr. | B26D 1/29 |
| | | | | | 241/92 |
| 4,283,979 | A | * | 8/1981 | Rakocy | B26D 3/225 |
| | | | | | 241/92 |
| 4,393,737 | A | | 7/1983 | Shibata | |
| 4,877,191 | A | | 10/1989 | Golob et al. | |
| 5,992,287 | A | | 11/1999 | Dube | |
| 6,213,008 | B1 | * | 4/2001 | Kuan | A47J 43/25 |
| | | | | | 241/101.1 |

(Continued)

*Primary Examiner* — Sean M Michalski
(74) *Attorney, Agent, or Firm* — Grogan, Tuccillo & Vanderleeden LLP

(57) ABSTRACT

A slicing disc assembly includes a disc body having a top surface, a bottom surface, a central hub, a circumferential edge, a first opening in the disc body between the central hub and the circumferential edge, and a second opening in the disc body between the central hub and the circumferential edge, an adjustable horizontal slicing blade associated with the first opening, the horizontal slicing blade being moveable in a direction perpendicular to the top surface of the disc body, and an adjustable vertical blade assembly associated with the second opening. The vertical blade assembly is moveable between a first position where a slicing element of the vertical blade assembly is located below a plane defined by the top surface of the disc body, and a second position where the slicing element of the vertical blade assembly extends above the plane.

20 Claims, 23 Drawing Sheets

(56) References Cited

U.S. PATENT DOCUMENTS

| | | | | |
|---|---|---|---|---|
| 6,302,014 B1* | 10/2001 | Kuan | ............... | A47J 43/1018 241/169.1 |
| 7,066,071 B2* | 6/2006 | Zeder | ............... | B26D 3/283 30/278 |
| 8,596,192 B2 | 12/2013 | Hauser et al. | | |
| 8,602,335 B2 | 12/2013 | Krasznai | | |
| 8,720,325 B2* | 5/2014 | Goncalves | ............... | A47J 43/0722 99/538 |
| 8,899,504 B2* | 12/2014 | Gushwa | ............... | A47J 43/0716 241/92 |
| 9,301,647 B2 | 4/2016 | Ekstrom | | |
| 10,028,619 B2* | 7/2018 | Aramburo | ............... | A47J 43/0788 |
| 10,092,138 B2* | 10/2018 | Gushwa | ............... | B26D 3/185 |
| 10,449,685 B2* | 10/2019 | Beber | ............... | A47J 43/0722 |
| 2017/0280938 A1 | 10/2017 | Candler | | |

* cited by examiner

FOOD SLICING DISC WITH ADJUSTABLE VERTICAL AND HORIZONTAL BLADES

FIELD OF THE INVENTION

The present invention relates generally to food processing devices and, more particularly, to a food slicing disc for a food processing device for slicing and shredding food items.

BACKGROUND OF THE INVENTION

A variety of food processors are known, many of which generally include a base housing an electric motor, a drive system, a rotatably driven blade, a bowl, a lid, a feed chute, and a food pusher. The feed chute allows food item to be introduced into the bowl while the lid engages the bowl and while the blade is rotating. This contains sliced food product inside the bowl and prevents user's hands from entering the bowl while the device is operating, since the chute is sized so that a user's hand cannot fit through it.

While the rotatably driven blade may be in any one of various known forms, a common form is a flat disc that has a radially extending gap of which the edge leading toward the rotational direction forms a blade that is used to cut or slice food product. The leading edge is off-set from the plane of the rest of the disc by a distance that defines a slice thickness. Certain existing slicing discs for such food processors may have a mechanism that allows for the space or gap between the leading edge of the blade and the plane of the disc to be selectively adjusted, allowing for the thickness of slices of food items to be varied.

While these existing food processing devices, and slicing discs therefor, are generally suitable for what is regarded as ordinary performance, there is room for improvement in terms of ease of use and expanded functionality. In particular, there is a need for a slicing disc for a food processor having adjustable vertical and horizontal blades for slicing, grating and/or chopping food items.

SUMMARY OF THE INVENTION

It is an object of the present invention to provide a food slicing disc for a food processor.

It is another object of the present invention to provide a food slicing disc that has both horizontal and vertical slicing blades for creating both horizontal and vertical slices through food items.

It is another object of the present invention to provide a food slicing disc for a food processor having a horizontal slicing blade that is adjustable to selectively vary slice thickness.

It is another object of the present invention to provide a food slicing disc for a food processor having a vertical slicing blade that can be selectively deployed and retracted.

These and other objects are achieved by the present invention.

According to an embodiment of the present invention, a rotatable slicing disc assembly for use with an electrically powered food processor appliance is provided. The slicing disc assembly includes a disc body having a top surface, a bottom surface, a central hub, a circumferential edge, a first opening in the disc body between the central hub and the circumferential edge, and a second opening in the disc body between the central hub and the circumferential edge, an adjustable horizontal slicing blade associated with the first opening, the horizontal slicing blade being moveable in a direction perpendicular to the top surface of the disc body to vary a gap between the horizontal slicing blade and the top surface of the disc body, and an adjustable vertical blade assembly associated with the second opening. The vertical blade assembly is moveable between a first position where a slicing element of the vertical blade assembly is located below a plane defined by the top surface of the disc body, and a second position where the slicing element of the vertical blade assembly extends above the plane defined by the top surface of the disc body.

According to another embodiment of the present invention, a method of operating a food processing device having a collection container, a slicing disc received atop the collection container, and a lid received atop the slicing disc is provided. The method includes the steps of adjusting a position of a horizontal slicing blade associated with a first opening in the slicing disc with respect to a plane defined by a top surface of the slicing disc, and rotating a vertical slicing blade assembly associated with a second opening in the slicing disc from a first position where a slicing element of the vertical slicing blade assembly is located below the plane defined by the top surface of the slicing disc, and a second position where the slicing element of the vertical slicing blade assembly extends above the plane defined by the top surface of the slicing disc.

According to yet another embodiment of the present invention, a rotatable slicing disc assembly for use with an electrically powered food processor appliance is provided. The slicing disc assembly includes a disc body having a top surface, a bottom surface, a central hub, a circumferential edge, a first opening in the disc body between the central hub and the circumferential edge, and a second opening in the disc body between the central hub and the circumferential edge, an adjustable horizontal slicing blade associated with the first opening, the horizontal slicing blade being moveable in a direction perpendicular to the top surface of the disc body to vary a gap between the horizontal slicing blade and the top surface of the disc body, and an adjustable vertical blade assembly associated with the second opening. The vertical blade assembly is moveable between a first position where a flat surface of the vertical blade assembly is in registration with the second opening to provide for only horizontal slicing of a food item, a second position where a plurality of coarse shredding elements of the vertical blade assembly are in registration with the second opening and extend therethrough and above the top surface of the disc body to provide for coarse shredding of the food item, and a third position where a plurality of fine shredding elements of the vertical blade assembly are in registration with the second opening and extend therethrough and above the top surface of the disc body to provide for fine shredding of the food item.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
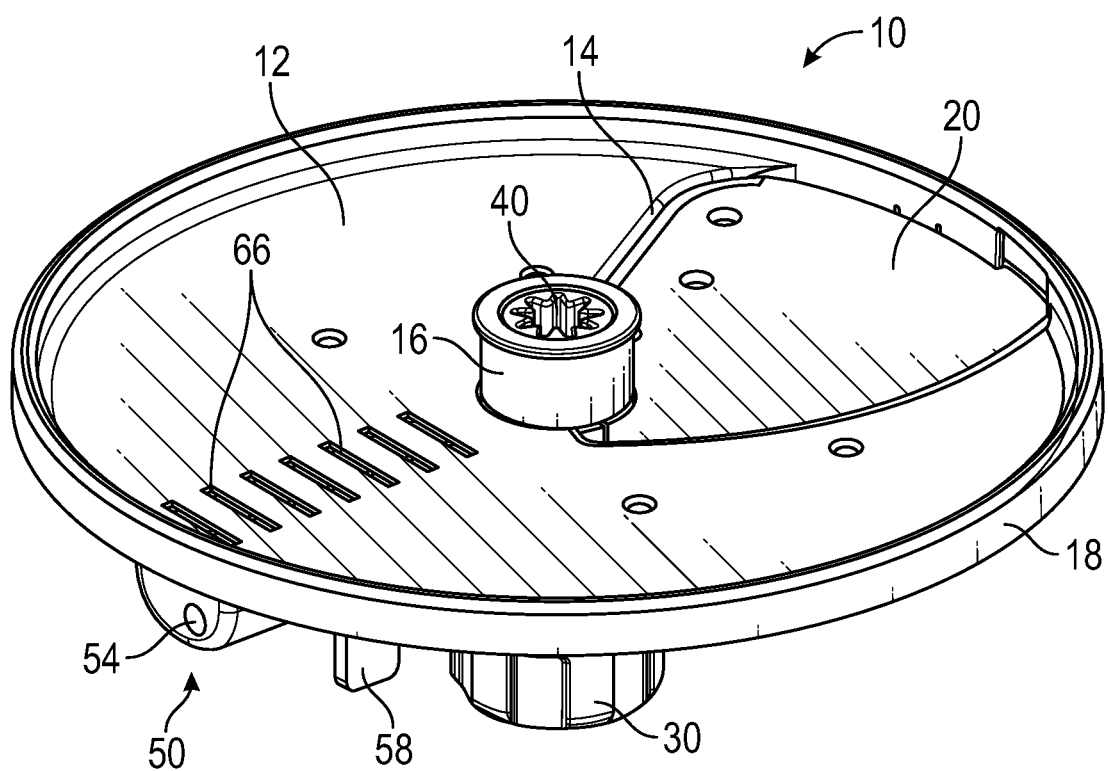
FIG. 1 is a top perspective view of a food slicing disc for a food processing device, according to an embodiment of the present invention, shown in a storage position.
Figure 2:
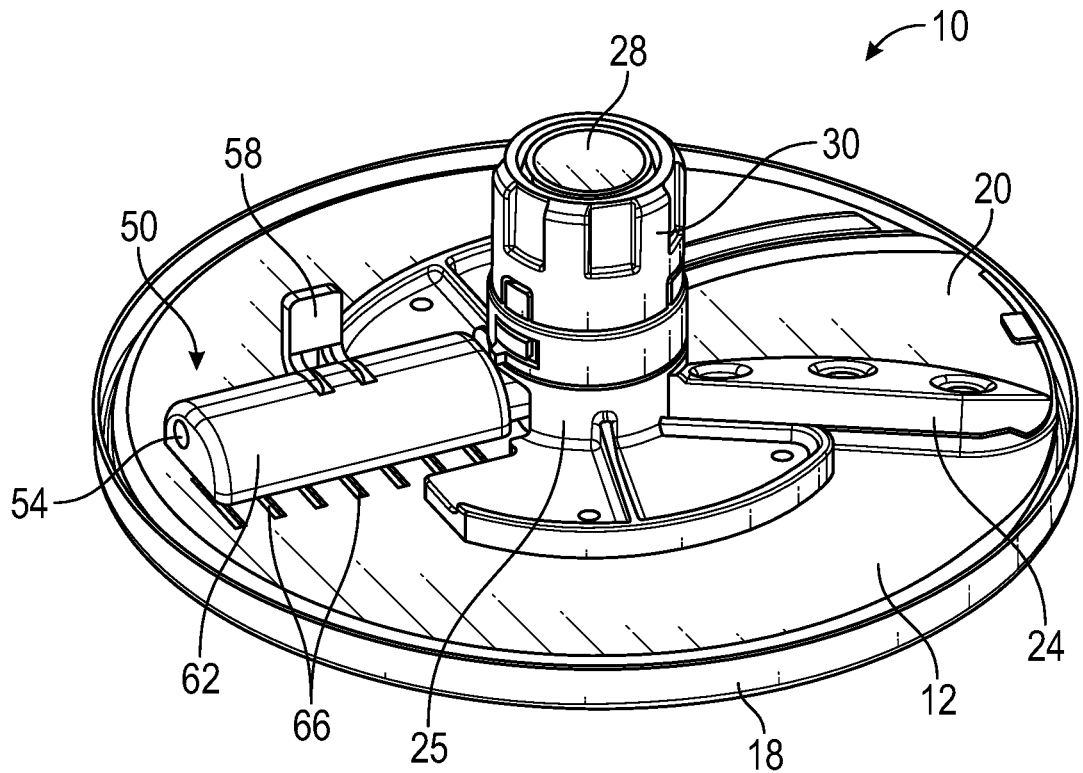
FIG. 2 is a bottom perspective view of the food slicing disc of FIG. 1.
Figure 3:
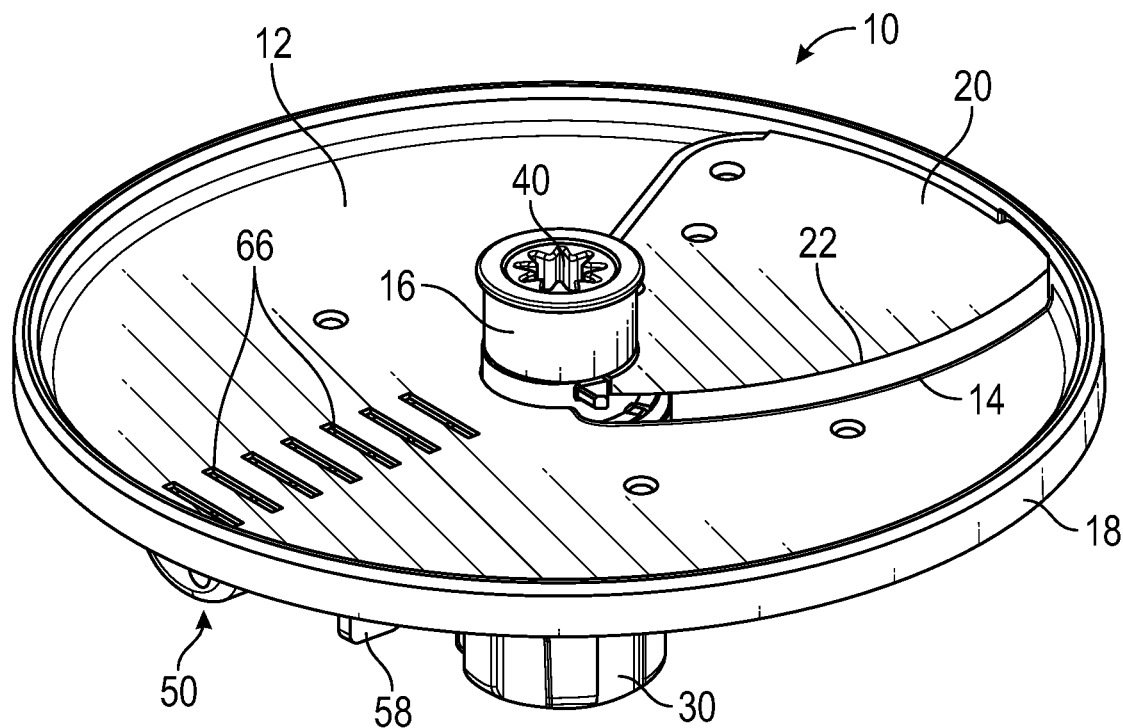
FIG. 3 is another top perspective view of the food slicing disc of FIG. 1, shown in a slicing position.
Figure 4:
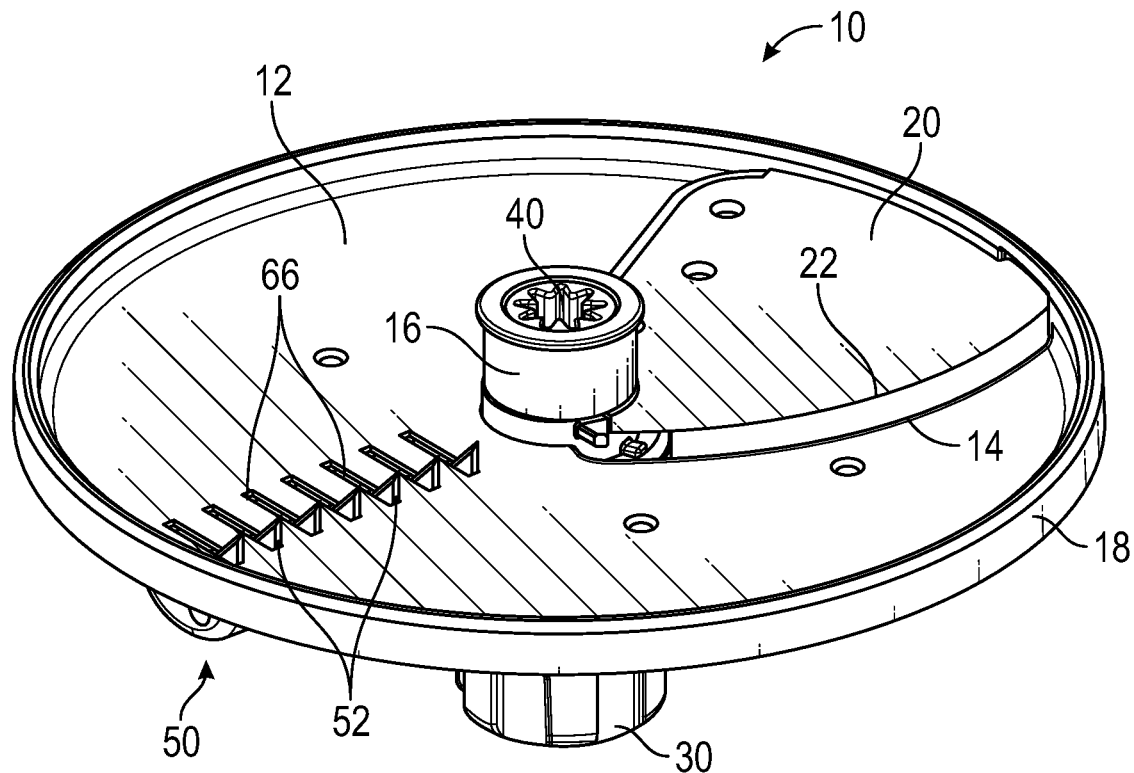
FIG. 4 is a top perspective view of the food slicing disc of FIG. 1, shown in a shredding position.

Referring to FIGS. 1-6, a rotatable food slicing disc 10 according to an embodiment of the present invention is illustrated. The slicing disc 10 is configured for use in a food processor (not shown) and includes a generally flat disc body 12 having a radially extending gap 14 formed therein and extending generally from a central hub 16 to a circumferential edge 18. The gap 14 may have a slightly arcuate shape to optimize cutting edge performance. A cutting or slicing blade 20 having a cutting edge 22 is attached to a blade support arm 24 which is formed unitarily with a support hub 16, and is configured to cut food items horizontally. Preferably, the cutting edge 22 is curved or arcuate to optimize cutting/slicing performance.

In an embodiment, the food slicing disc 10 includes a mechanism for selectively adjusting the spacing between the cutting edge 22 and the disc body 12, to allow for adjustment of the thickness of slices of food items. For example, in an embodiment, the adjustment mechanism may be that disclosed in U.S. Pat. No. 8,602,335, which is hereby incorporated by reference herein in its entirety. In particular, in an embodiment and as shown in FIGS. 1-6, the support hub 16 is telescopically received inside of a hub collar 25. A plurality of disc support arms 26 extend radially out from the hub collar 24 and support the disc body 12. The support hub 16 has a proximal end 28 about which an adjusting sleeve 30 is mounted. The sleeve 30 may have ribs 32 for enhanced gripping by a user's hand.

The proximal end 28 and the sleeve 30 adjustably interface with each other via threads 36, 38 or other known means so that they may be longitudinally adjusted relative to each other such that rotating the sleeve 30 advances the support hub 16 and, thus, the attached blade 20 in a longitudinal direction relative to the disc body 12 in order to selectively adjust slicing width. For example, preferably the sleeve 30 has internal threads 38 and the proximal end 28 of the hub 16 has external threads 36, so that rotation of the sleeve 30 relative to the hub 16 will cause the hub 16 to move linearly toward or away from the sleeve 30, depending on direction of rotation. This facilitates adjustment of the position of the cutting edge 22 in a plane generally parallel to the disc body 12. This results in adjusting thickness of slicing of food products by the cutting edge 22. A torque transmitting opening 40 is provided for mounting the disc assembly to a rotatable output shaft of a motor of a food processor, as is known in the art.

With further reference to FIGS. 1-6, in an embodiment, in addition to having a horizontal slicing blade and a mechanism for adjusting the vertical position of such blade with respect to the disc body 12 to allow slice thickness to be adjusted, the food slicing disc 10 also includes a vertical blade assembly 50 that is moveable between a retracted position where a plurality of vertical slicing blades are positioned below the top surface of the flat disc body 12, and an extended position where the plurality of vertical slicing blades extend through the disc body 12 and upwardly therefrom to make vertical cuts through food items, as discussed in detail hereinafter. As perhaps best illustrated in FIGS. 5, 6, 14 and 15, the vertical blade assembly 50 includes a plurality of horizontally-spaced blades 52 fixedly mounted to a rotatable shaft 54. For example, in an embodiment, each of the blades 52 may have a mounting aperture 56, and the shaft 54 is configured or keyed so as to receive each of the blades 52, via the respective mounting apertures 56, in spaced relationship thereon. Importantly, the mounting apertures 56 and shaft 54 are configured such that the shaft 54 is not able to rotate relative to the blades 52, but rather that the blades 52 are maintained in fixed position on the shaft 54 so as to be rotatable therewith about a rotational axis of the shaft 54. The vertical blade assembly 50 further includes a lever 58 fixedly mounted to the shaft 54 (e.g., at a general midpoint thereof), which enables rotation of the shaft 54 using the lever 58, as described hereinafter. The vertical blade assembly 50 also includes a limit screw 60 mounted to the shaft 54, which functions to limit the degree of rotation of the shaft 54.

Figure 5:
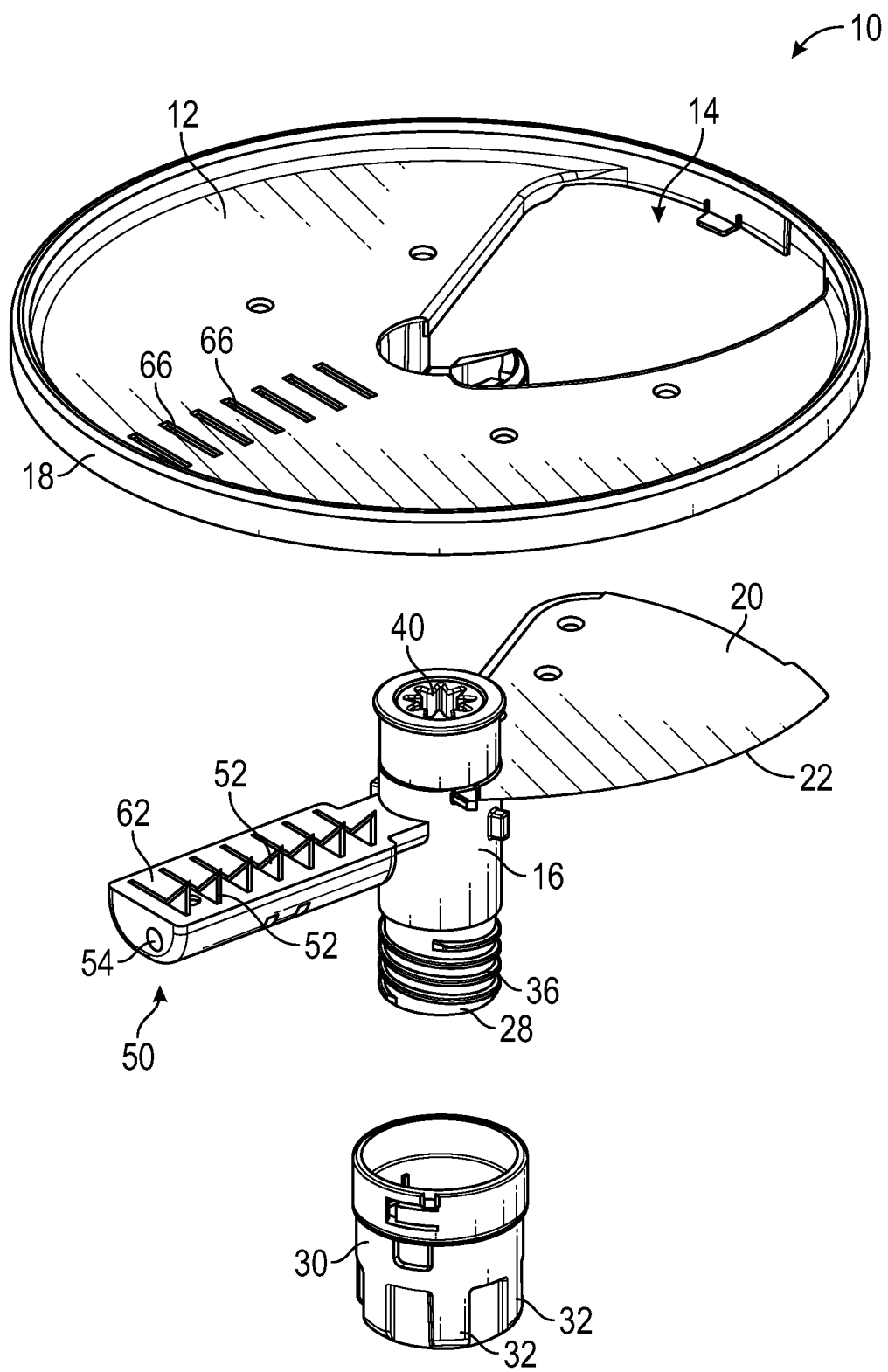
FIG. 5 is an exploded, perspective view of the food slicing disc of FIG. 1.
Figure 6:
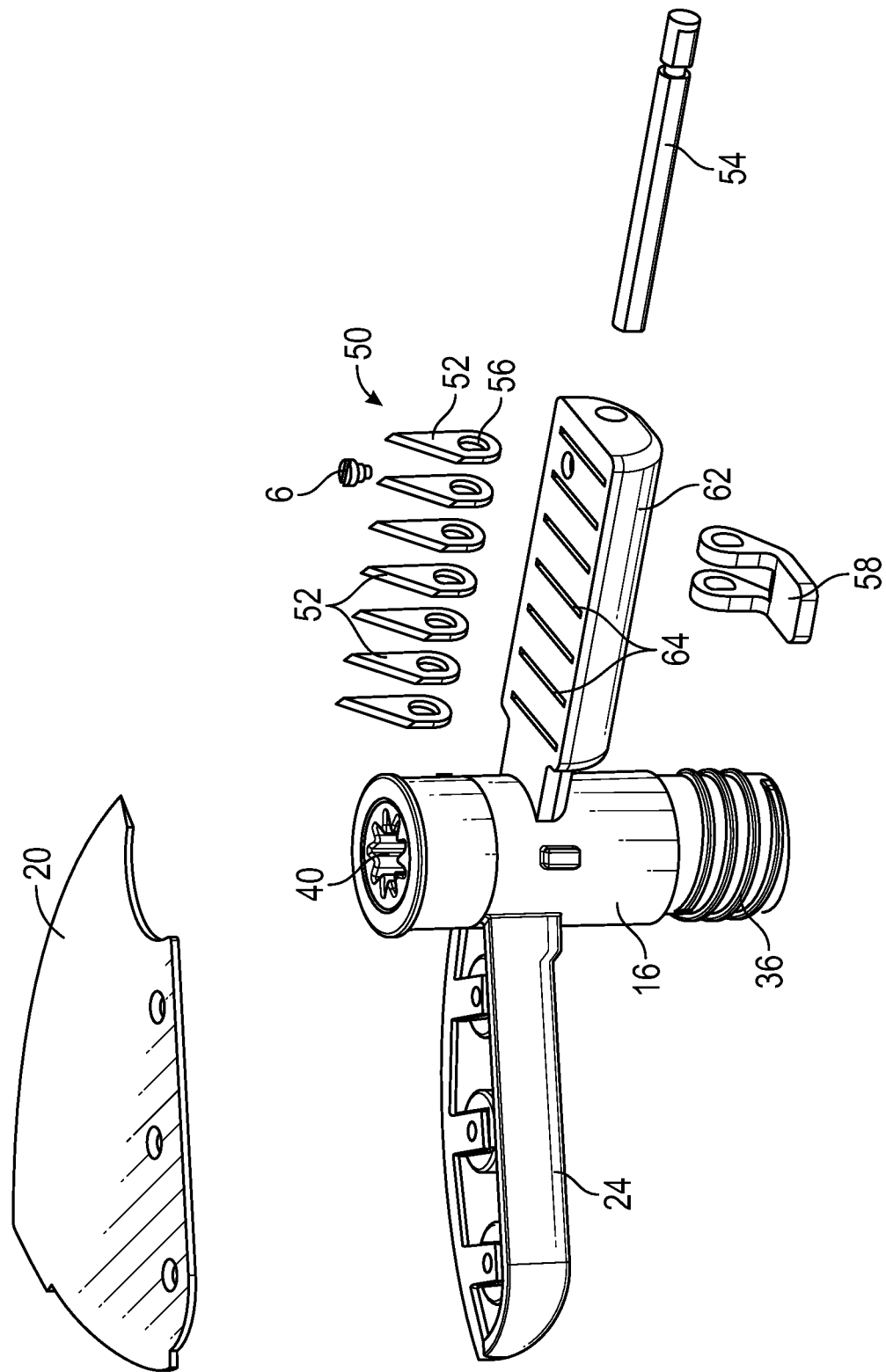
FIG. 6 is an exploded, perspective view of horizontal and vertical blade assembly of the food slicing disc of FIG. 1.

In an embodiment, the vertical blade assembly 50 further includes a housing 62 fixedly connected to the central hub 16 and extending radially therefrom opposite the horizontal slicing blade 20. As shown in FIGS. 5 and 6, in an embodiment, the housing 62 is generally semi-circular in cross-section, having an arcuate underside surface and a generally planar top surface having a plurality of slots 64 formed therein corresponding to the plurality of blades 52.

Referring back to FIGS. 1-5, the disc body 12 further includes a plurality of slots 66 that are aligned with the slots 64 in the housing 62 of the vertical blade assembly 50, which allow the blades 52 to be extended through the disc body 12 in the manner described hereinafter. Importantly, both the vertical blade assembly 50 and the horizontal slicing blade 20 are fixedly connected to the central hub, such that vertical adjustment of the horizontal slicing blade 20 relative to the disc body 12 also effects a corresponding vertical adjustment of the vertical blade assembly 50 relative to the disc body. In addition, the length of the blades 52 is such that they extend upward from the disc body 12 (when in the extended position) to an extent that is greater than the vertical space between the horizontal slicing blade 20 and disc body 12 (for all positions of the horizontal slicing blade 20). This ensures that the vertical slicing blades 52 are able to cut through the entire thickness of the slices of food items produced by the horizontal slicing blade 20.

Figure 7:
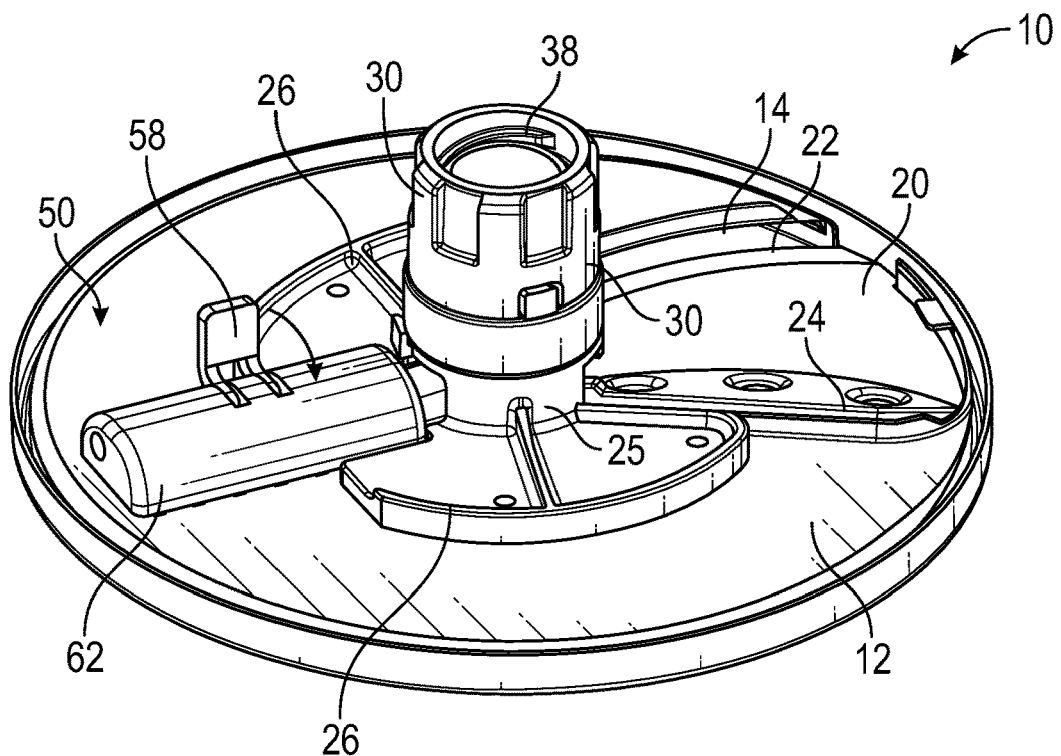
FIG. 7 is a bottom, perspective view of the food slicing disc of FIG. 1, illustrating an actuator of the vertical blade assembly in a retracted position.
Figure 8:
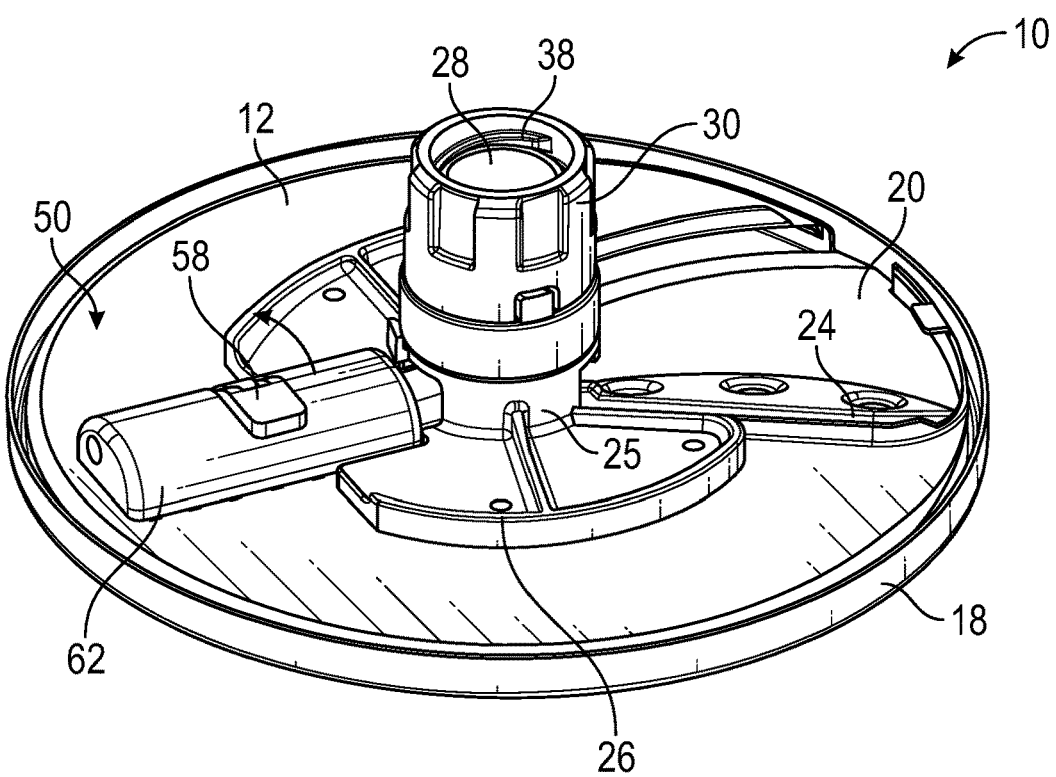
FIG. 8 is a bottom, perspective view of the food slicing disc of FIG. 1, illustrating the actuator of the vertical blade assembly in an extended position.
Figure 9:
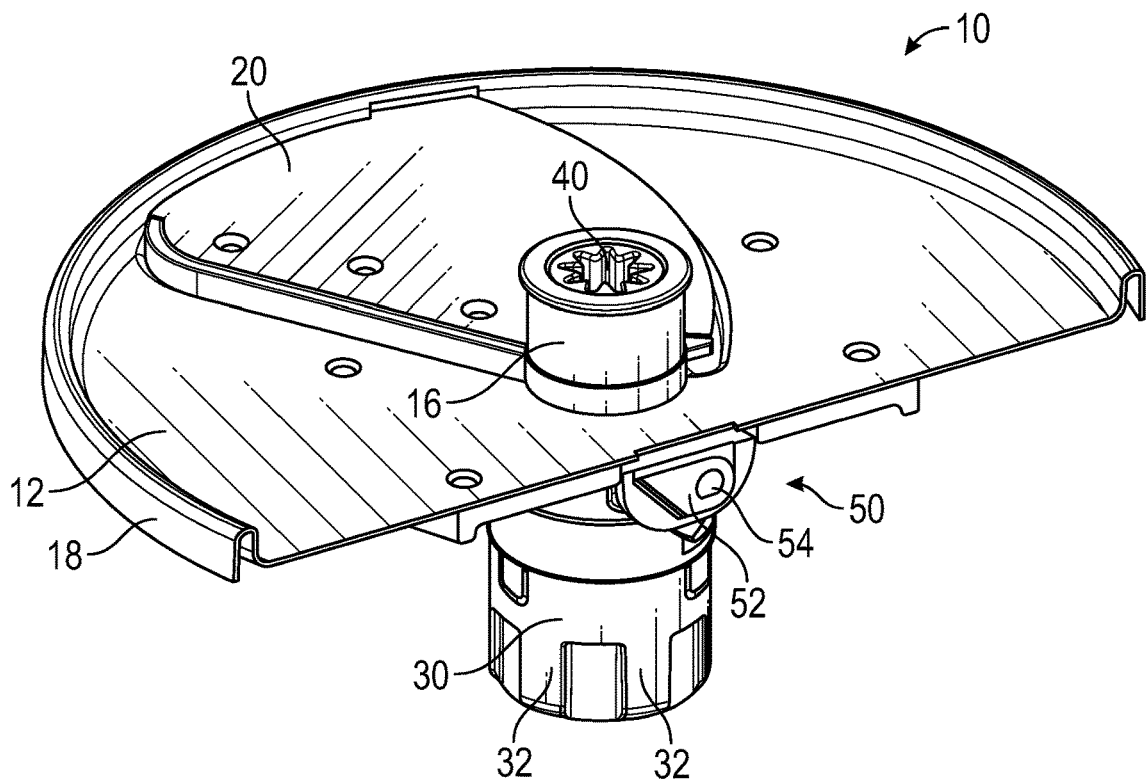
FIG. 9 is a partial cross-sectional view of the food slicing disc of FIG. 1, shown the vertical blade assembly in the retracted position.
Figure 10:
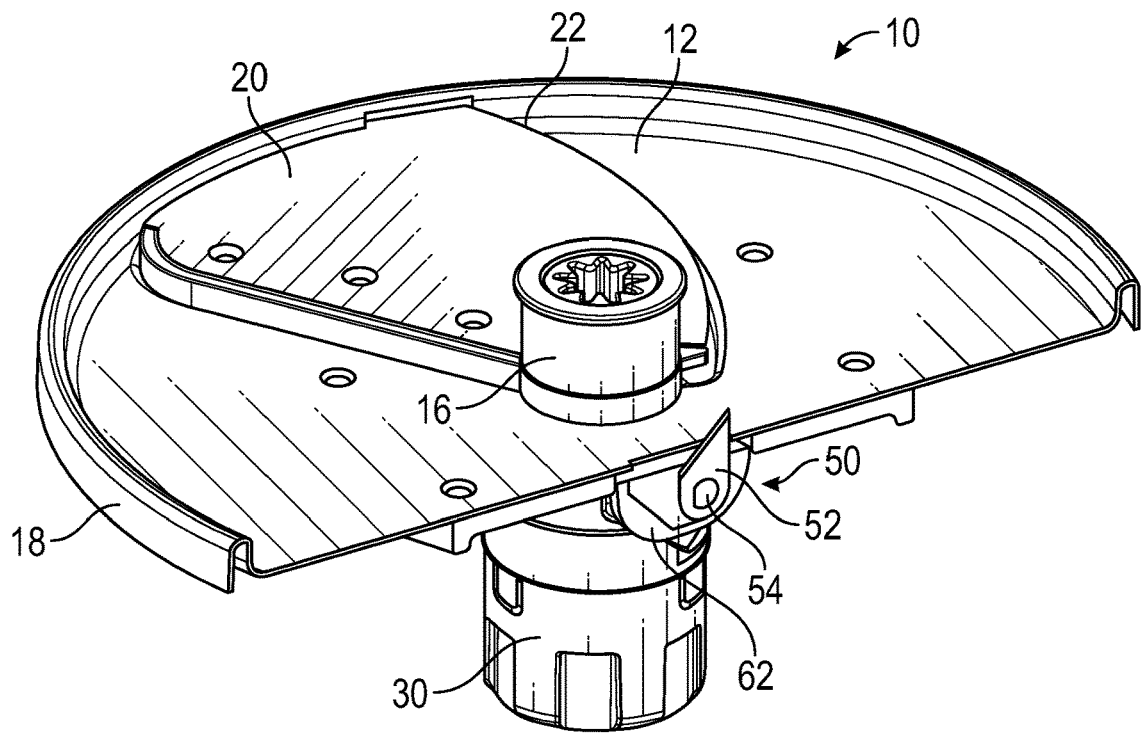
FIG. 10 is a partial cross-sectional view of the food slicing disc of FIG. 1, shown the vertical blade assembly in the extended position.

Referring back to FIGS. 1-3 and 9, the vertical blade assembly 50 is shown in a storage or retracted position where the shaft 54 is rotated to a position such that the vertical slicing blades 52 are positioned within the housing 62 and do not extend through slots 64 in the housing 62 or slots 66 in the disc body 12. As shown in FIG. 7, to move the vertical blade assembly 50 to its extended or deployed position, the lever 58 is moved in the direction indicated by the arrow, which rotates the connected shaft 52 and thus the blades 52 to a position where they extend vertically from the housing 62 and through the slots 66 in the disc body 12 (as shown in FIGS. 4, 10, 13 and 16). To retract the blades 52, the lever 58 is rotated in the opposite direction, as indicated by the arrow in FIG. 8. This movement effects a corresponding rotational movement of the shaft 54 and connected blades 52, so that they are rotated back into the housing 62 beneath the plane of the disc body 12.

Figure 11:
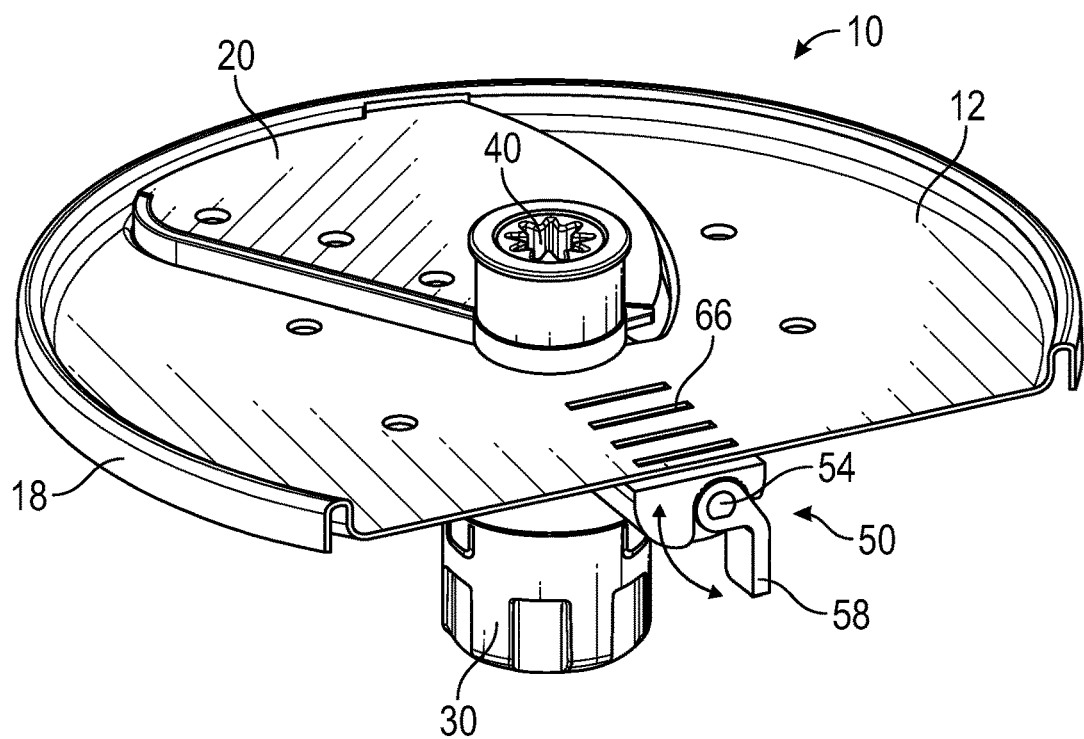
FIG. 11 is another partial cross-sectional view of the food slicing disc of FIG. 1, shown the vertical blade assembly in the retracted position.
Figure 12:
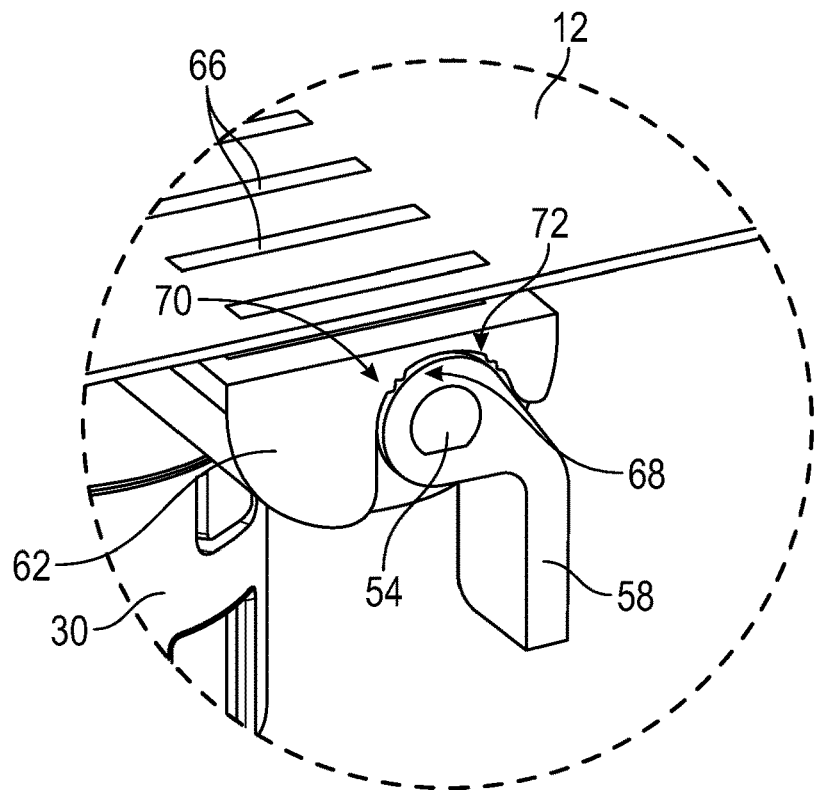
FIG. 12 is an enlarged, detail view of an actuator lever of the vertical blade assembly.
Figure 13:
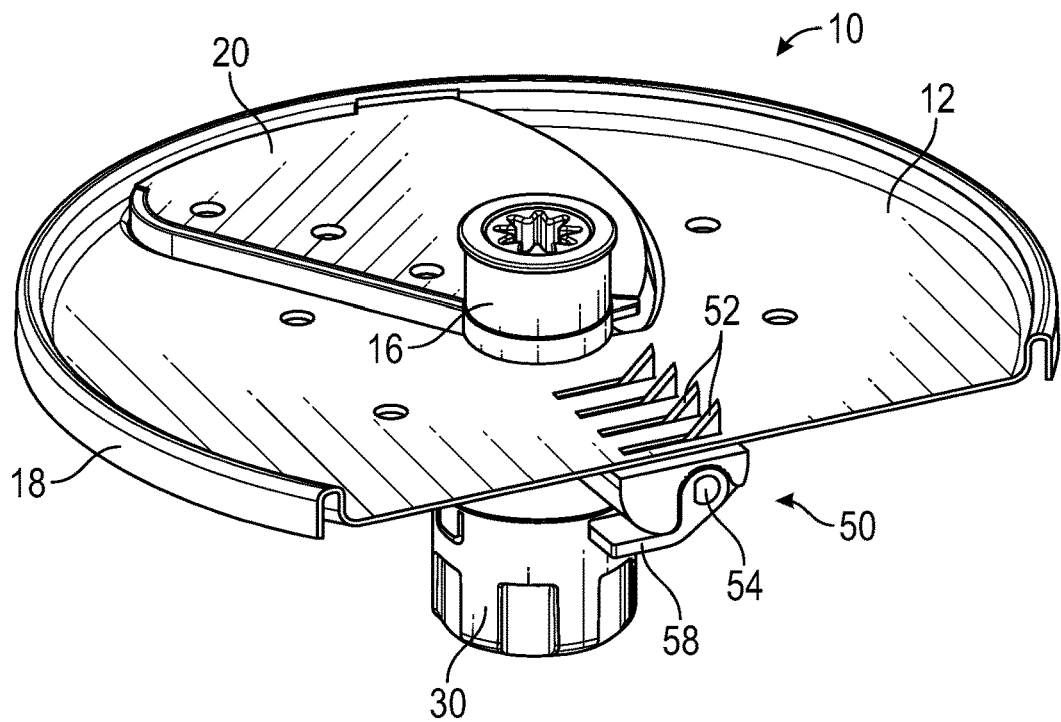
FIG. 13 is another partial cross-sectional view of the food slicing disc of FIG. 1, shown the vertical blade assembly in the extended position.
Figure 14:
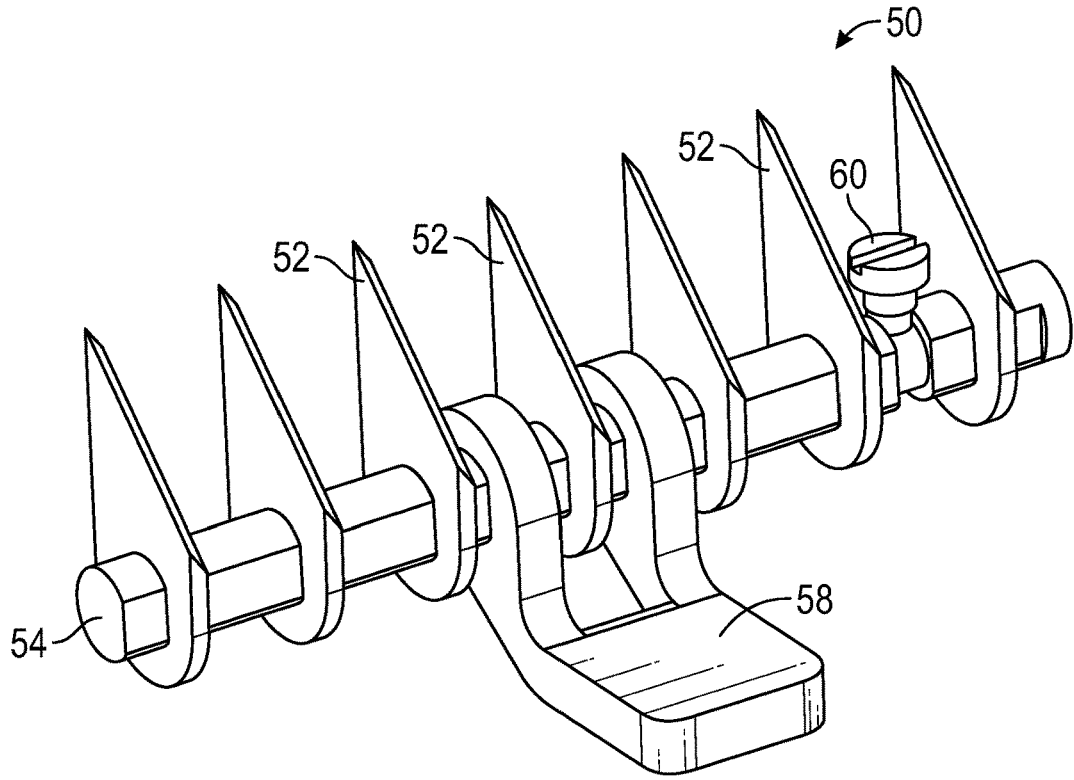
FIG. 14 is a perspective view of the vertical blade assembly of the food slicing disc of FIG. 1.
Figure 15:
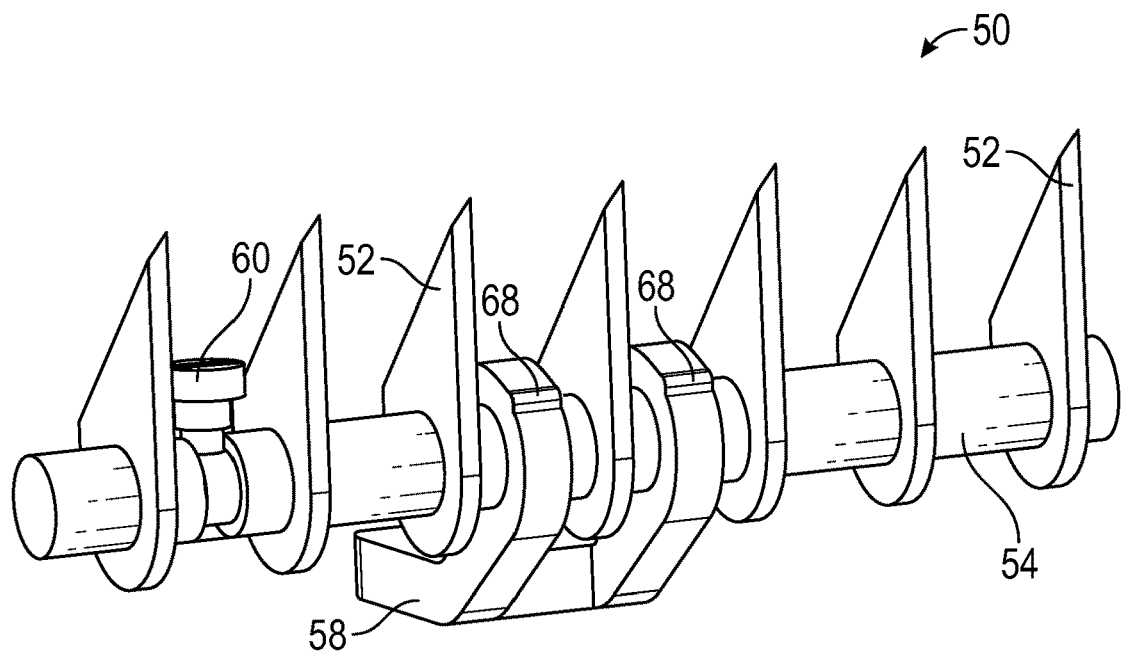
FIG. 15 is another perspective view of the vertical blade assembly of the food slicing disc of FIG. 1.
Figure 16:
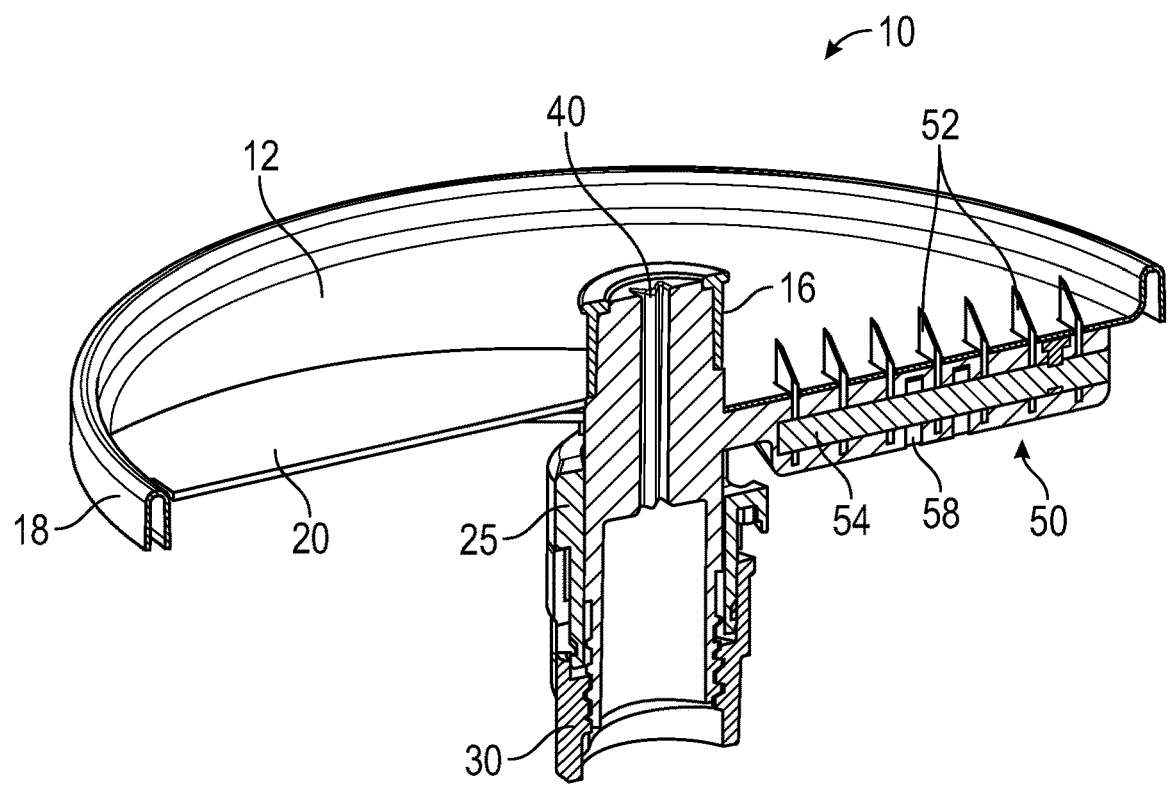
FIG. 16 is a cross-sectional view of the food slicing disc of FIG. 1, illustrating the vertical blade assembly in cross-section.

As shown in FIG. 12, in an embodiment, the lever 58 may include a projection 68 that is designed to engage one of two corresponding retaining features 70, 72 (e.g., grooves) formed in the housing 62. This retaining mechanism functions to retain the shaft 54 and blades 52 in the retracted or extended position, respectively. The blade assembly 50 can be easily moved out of these positions by exerting a sufficient rotational force on the lever 58, as shown in FIG. 11, such that the projection 68 is disengaged from the corresponding retaining feature 70, 72, respectively.

In operation, the vertical position of the horizontal blade 20 can be adjusted using the sleeve 30 to adjust the slice thickness of food items sliced by blade 20. At the same time, the vertical blade assembly 50 and blades 52 thereof can be retracted to produce only horizontal slices of food items of a desired thickness, or extended and used in combination with the horizontal slicing blade 20 to vertically slice the food items to produce julienne or shredded strips of food items. Importantly, the vertical blades 52 are so located, and the direction of rotation is such that the vertical blades 52 first slice the food items vertically, and the horizontal slicing blade 20 then slices the food items horizontally, to produce thin strips of food.

Referring now to FIGS. 17-24, a rotatable food slicing disc 100 according to another embodiment of the present invention is illustrated. The food slicing disc 100 is generally similar to slicing disc 10, where like reference numerals designate like parts. In particular, similar to slicing disc 10, slicing disc 100 includes an horizontal slicing blade 20 that is adjustable using sleeve 30 to vary the horizontal slice thickness of food items. The slicing disc 100 also includes a shredding or grating assembly 150 that is moveable between an extended or deployed position where a shredding surface is positioned to shred a food item, and a retracted position where the shredding surface is moved to a position where it is not capable of interacting with a food item.

As shown therein, in an embodiment, the shredding assembly 150 includes a generally triangularly-shaped body 152 having rectangular-shaped sides defining a first outwardly facing flat surface 154 and a second outwardly facing shredding surface 156 having a plurality of arcuate shredding knives or elements 158 extending upwardly therefrom.

Figure 22:
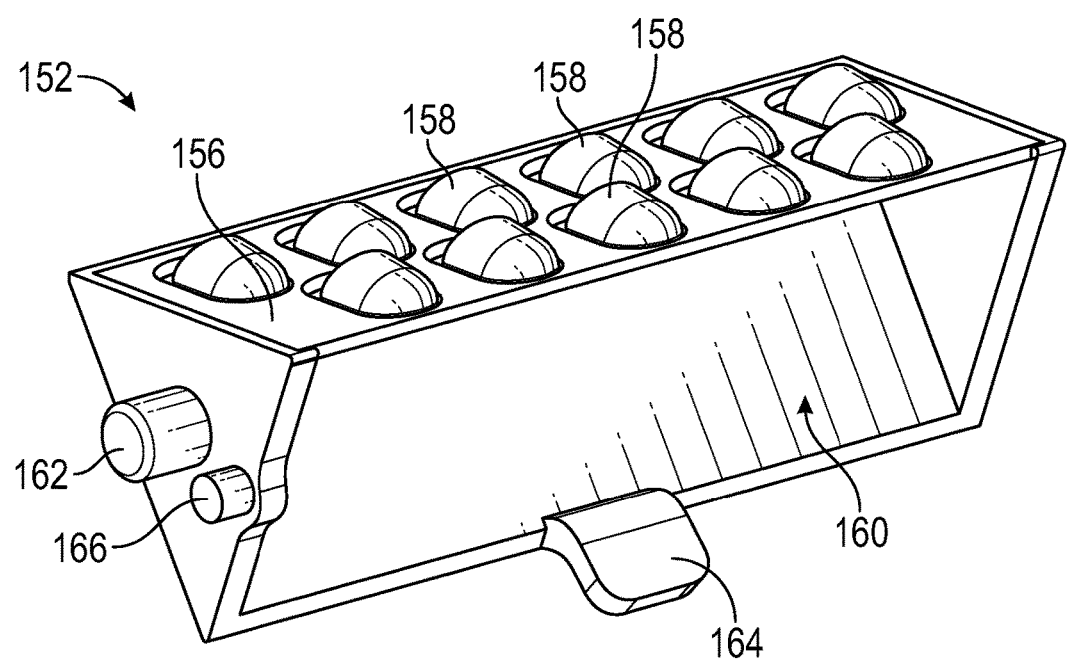
FIG. 22 is a perspective view of the shredding blade assembly of the food slicing disc of FIG. 17.
Figure 23:
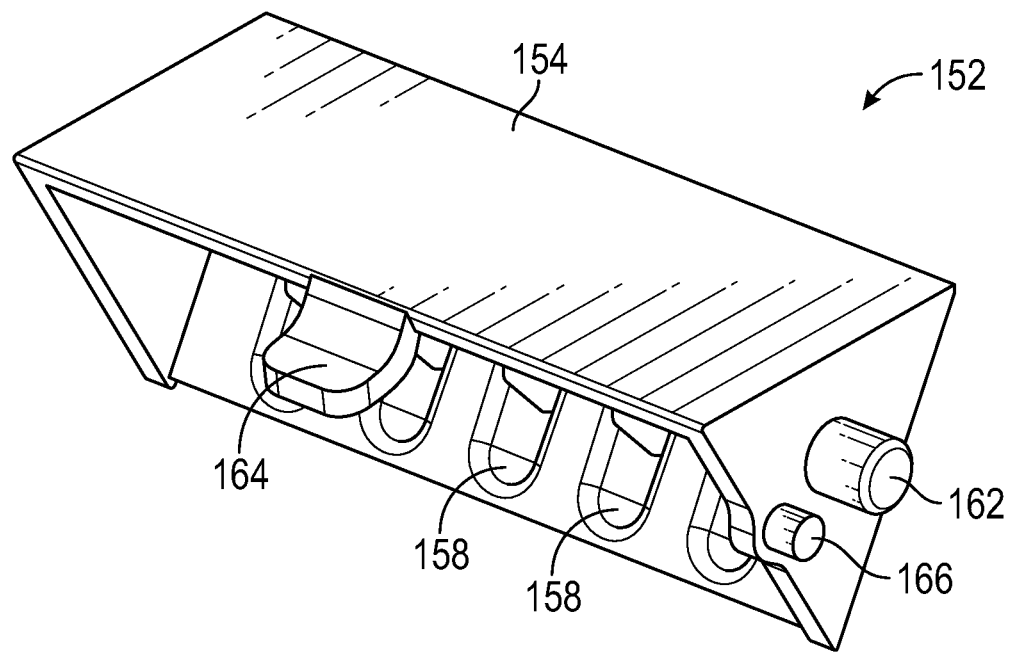
FIG. 23 is another perspective view of the shredding blade assembly of the food slicing disc of FIG. 17.
Figure 24:
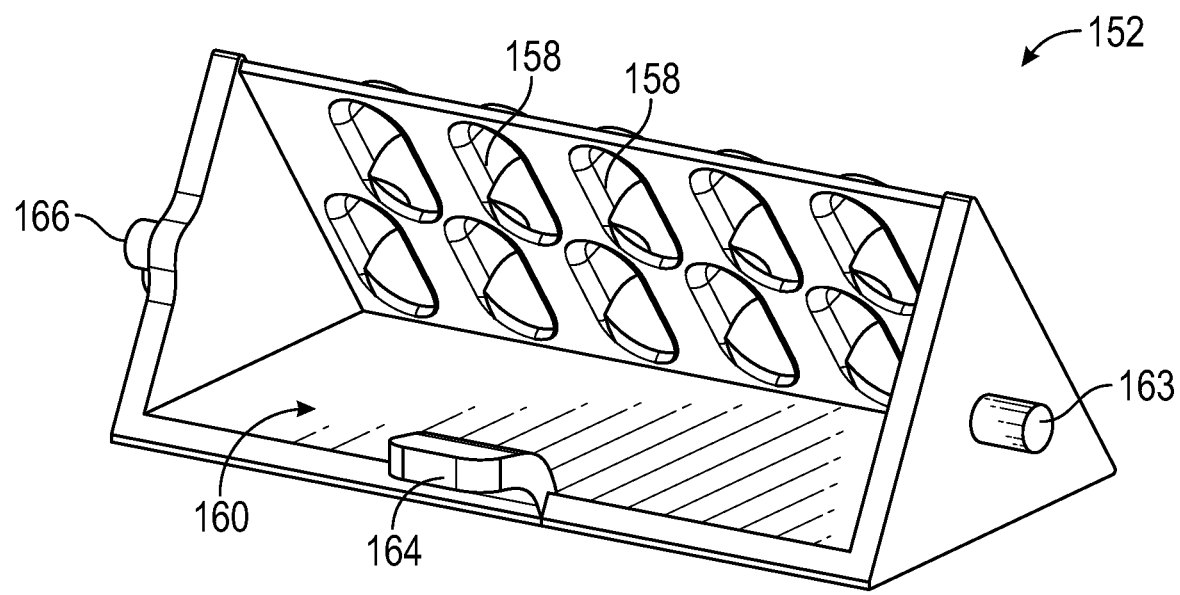
FIG. 24 is yet another perspective view of the shredding blade assembly of the food slicing disc of FIG. 17.
Figure 25:
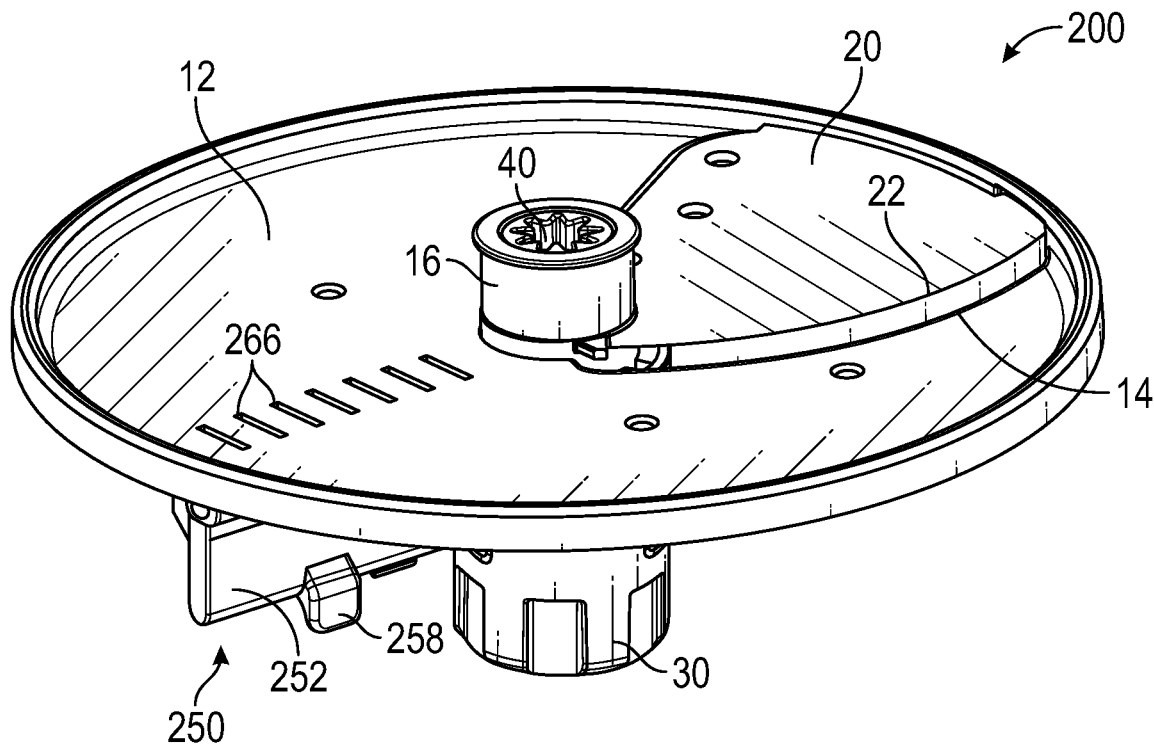
FIG. 25 is a top perspective view of a food slicing disc for a food processing device, according to another embodiment of the present invention, showing a vertical blade assembly thereof in a retracted position.

A third side of the body defines a rectangular opening 160 that allows food shredded by blades 158 to fall into a processing container within which the food slicing disc 100 is positioned. As best shown in FIG. 22, the shredding assembly 150 further includes a pair of opposed mounting pins 162 or axles extending from opposed ends thereof about which the body 122 may rotate, as discussed hereinafter. The body 152 also includes a lever 164 that can be manipulated by a user to rotate the body 152 about an axis defined by the mounting pin 162, as well as a position stop in the form of a projection 166 at one end of the body 152 for limiting rotation of the body 152, as discussed in detail hereinafter.

Figure 20:
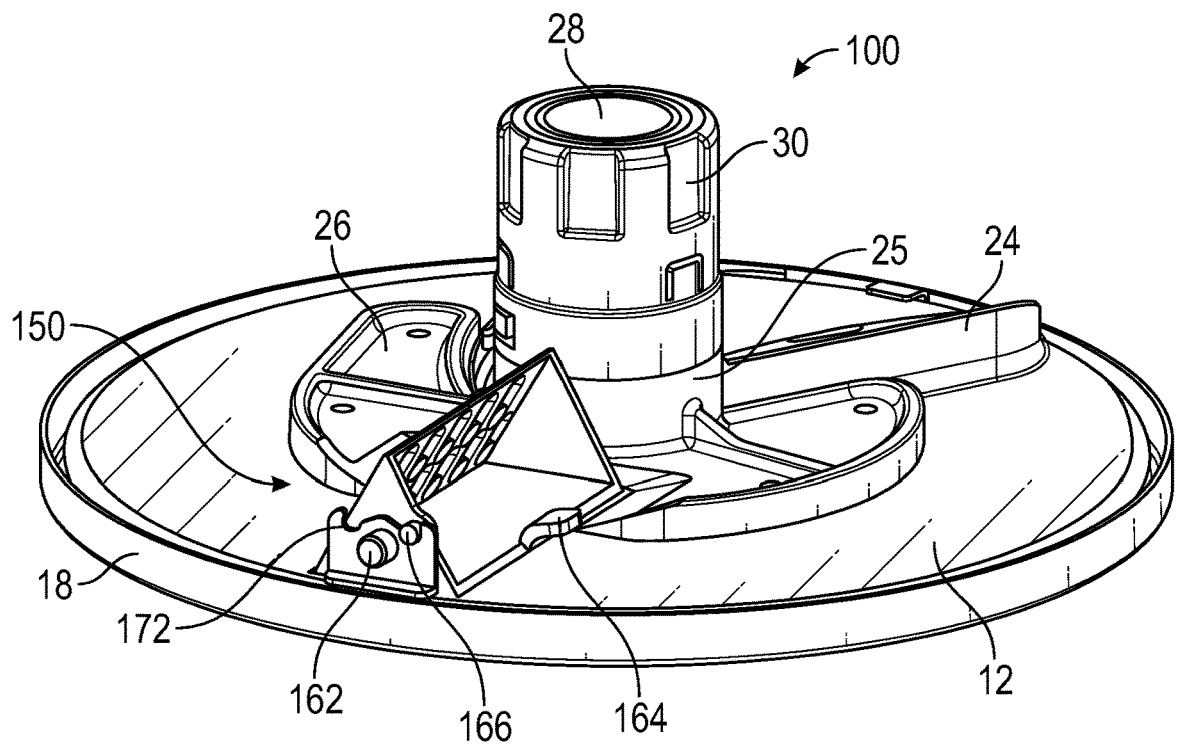
FIG. 20 is another bottom perspective view of the food slicing disc of FIG. 17, showing the shredding blade assembly in the retracted position.
Figure 21:
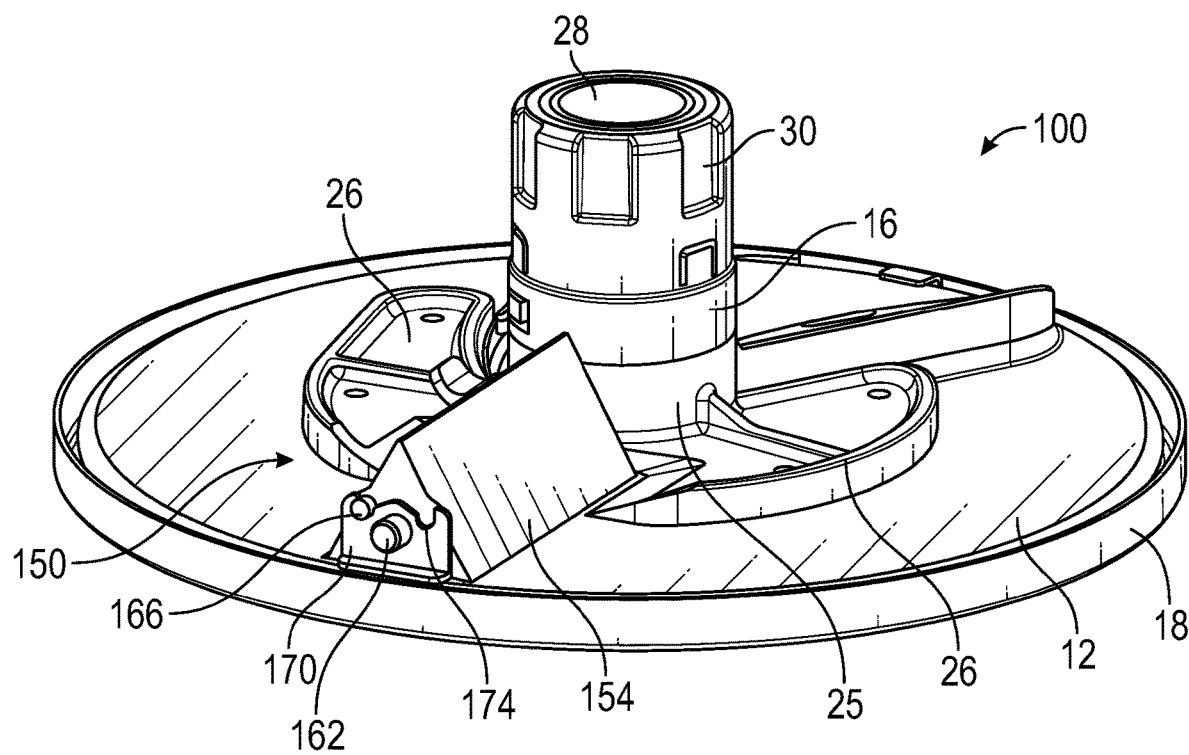
FIG. 21 is another bottom perspective view of the food slicing disc of FIG. 17, showing the shredding blade assembly in the deployed position.

With reference to FIGS. 17-21, the disc body 12 is formed with an opening 168 that corresponds in size and shape to the sides of the body 152 of the shredding assembly 150. In an embodiment, the opening 168 is rectangular and is positioned opposite opening 14 with which the horizontal slicing blade 20 is associated. The grating assembly 150 further includes at least one, and preferably a pair of, opposed mounting brackets 170 affixed to the underside surface of the disc body 12, to which the body 152 is rotatably coupled. In particular, the opposed mounting pins 162 may be received in corresponding openings in the mounting brackets 170, for rotation of the body 152 about an axis extending through the mounting pins 162. As best shown in FIGS. 20 and 21, in an embodiment, the mounting bracket 170 includes opposed seats 172, 174 that are configured to receive the position stop 166 to limit rotation of the body 152.

Figure 17:
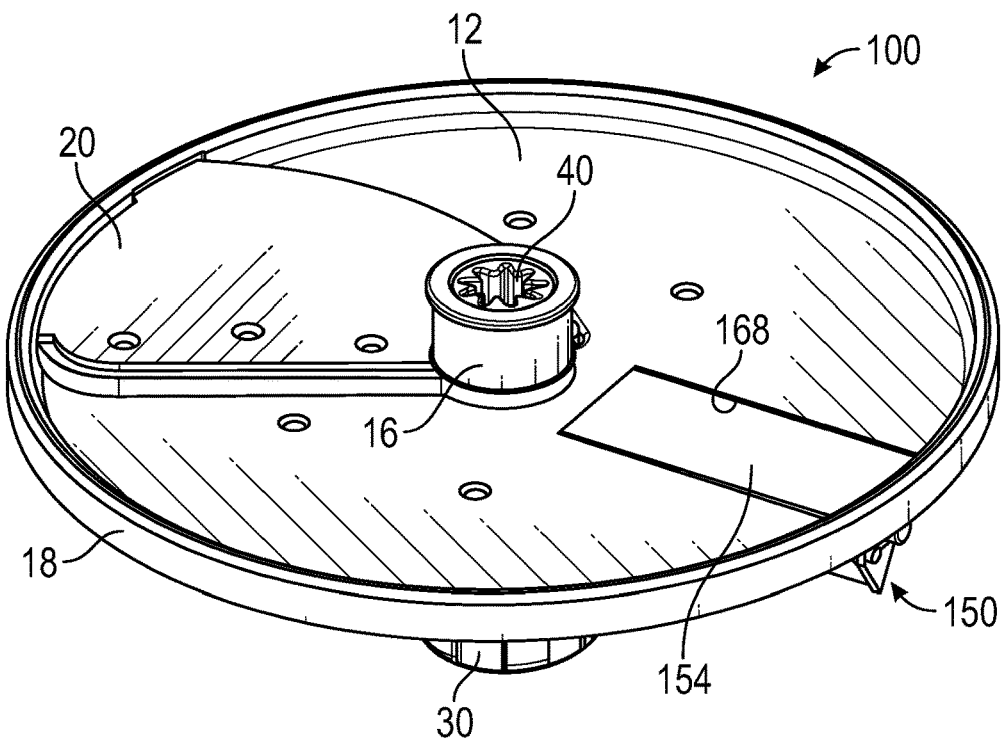
FIG. 17 is a top perspective view of a food slicing disc for a food processing device, according to another embodiment of the present invention, showing a shredding assembly in a retracted position.
Figure 18:
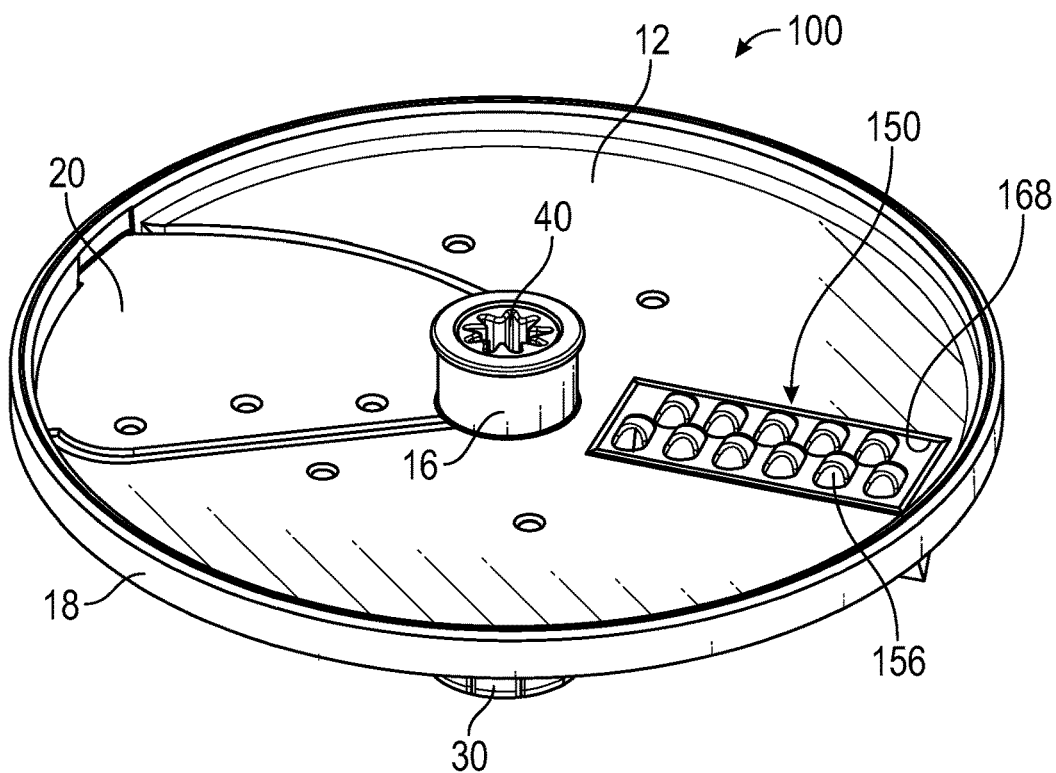
FIG. 18 is a top perspective view of the food slicing disc of FIG. 17, showing the shredding blade assembly in a deployed position.
Figure 19:
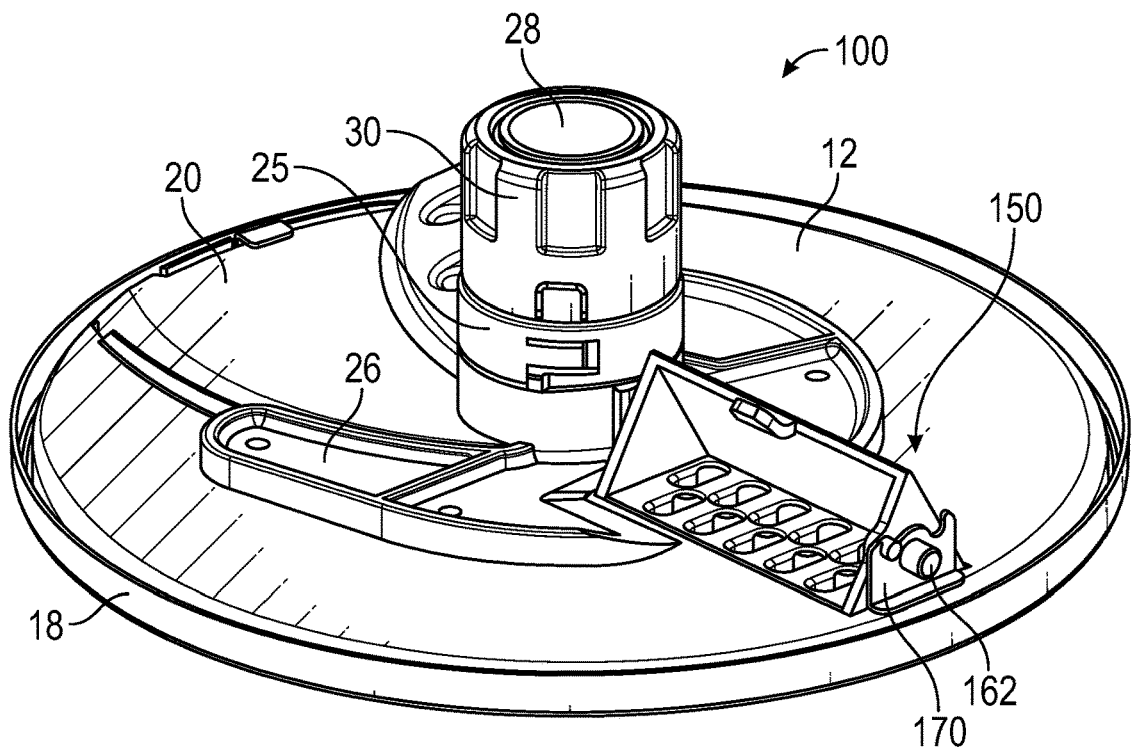
FIG. 19 is a bottom perspective view of the food slicing disc of FIG. 17, showing the shredding blade assembly in the deployed position.

As illustrated in FIGS. 17 and 20, in use, the horizontal slicing disc may be adjusted to slice food items to a desired thickness, in the manner described above. In such a horizontal slicing mode of operation, the body 152 of the shredding assembly 150 is rotated about the mounting pins 162 to a position where the flat surface 154 of the body is in registration with the opening 168 in the disc body 12. In this position, projection 166 is seated within seat 174, ensuring that the flat surface 154 remains aligned with the opening 169 in the disc body 12. As illustrated in FIGS. 18-21, in order to shred or grate food items, the horizontal slicing blade 20 is adjusted using sleeve 30 so that it is generally coplanar with the disc body 12 so that the edge 22 does not act on food items. The body 152 is then rotated using lever 164 until the position stop 166 contacts seat 172. In this position, the shredding or grating surface 156 of the body 152 faces upwardly and is positioned within the opening 168 ion the disc body 12. In this position, the shredding or grating elements 158 grate or shred food items as the disc body 12 is rotated.

Referring now to FIGS. 25-30, a rotatable food slicing disc 200 according to another embodiment of the present invention is illustrated. The food slicing disc 200 is generally similar to slicing disc 10, where like reference numerals designate like parts. In particular, similar to slicing disc 10, slicing disc 200 includes an horizontal slicing blade 20 that is adjustable using sleeve 30 to vary the horizontal slice thickness of food items, as well as a vertical blade assembly 250 that is moveable between a retracted position where a plurality of vertical slicing blades are positioned below the top surface of the flat disc body 12, and an extended position where the plurality of vertical slicing blades extend through the disc body 12 and upwardly therefrom to make vertical cuts through food items, as discussed in detail hereinafter.

Figure 29:
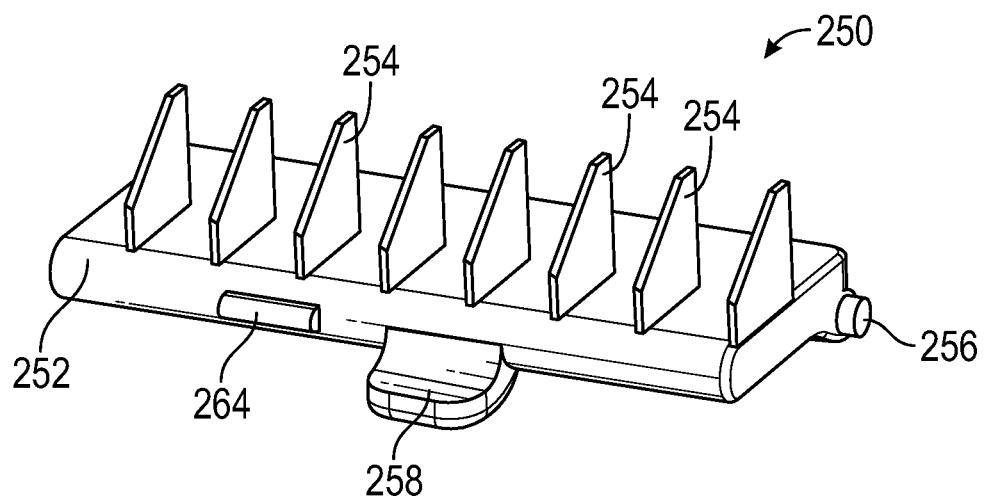
FIG. 29 is a perspective view of the vertical blade assembly of the food slicing disc of FIG. 25.
Figure 30:
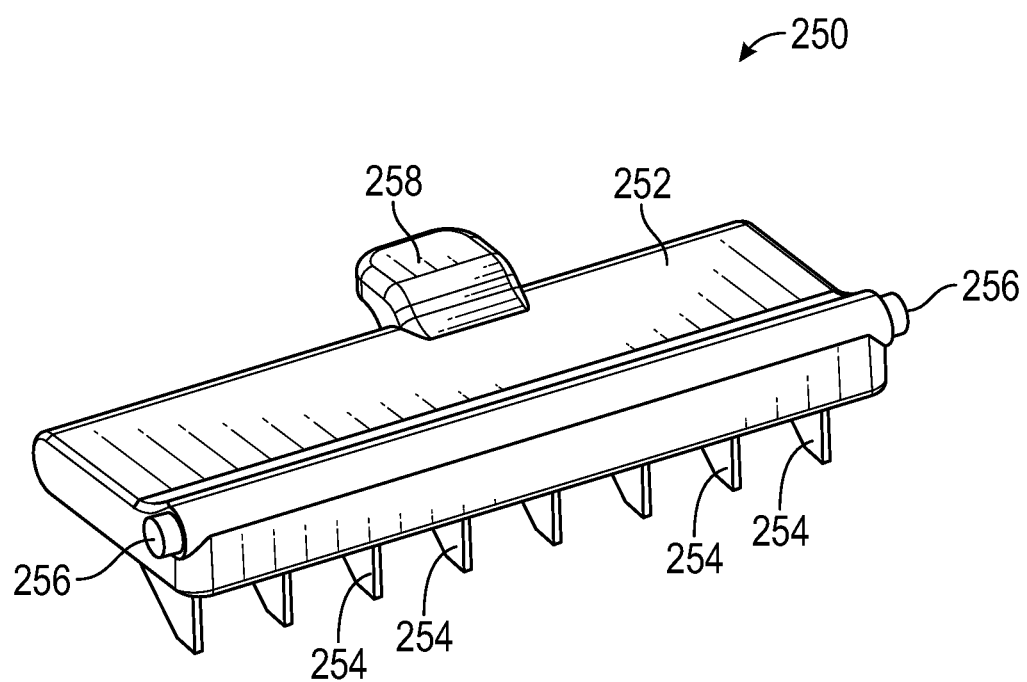
FIG. 30 is another perspective view of the vertical blade assembly of the food slicing disc of FIG. 25.

As best illustrated in FIGS. 29 and 30, the vertical blade assembly 250 includes a generally rectangular-shaped body portion 252 and a plurality of horizontally-spaced blades 254 extending from one face of the body portion 252. As shown in FIG. 29, in an embodiment, the blades 254 are aligned along a lower edge of the body portion. The vertical blade assembly 250 also includes a pair of projections 256 extending from opposed lateral sides of the body portion 252 adjacent to the upper edge of the body portion 252, and which define a rotational axis of the vertical blade assembly 250, as discussed hereinafter. Still further, the vertical blade assembly 250 also includes a lever 258 in the form of a tab that extends from a lower edge of the body portion 252, and which is used to rotate the vertical blade assembly 250 about the axis extending through the projections 256.

Figure 27:
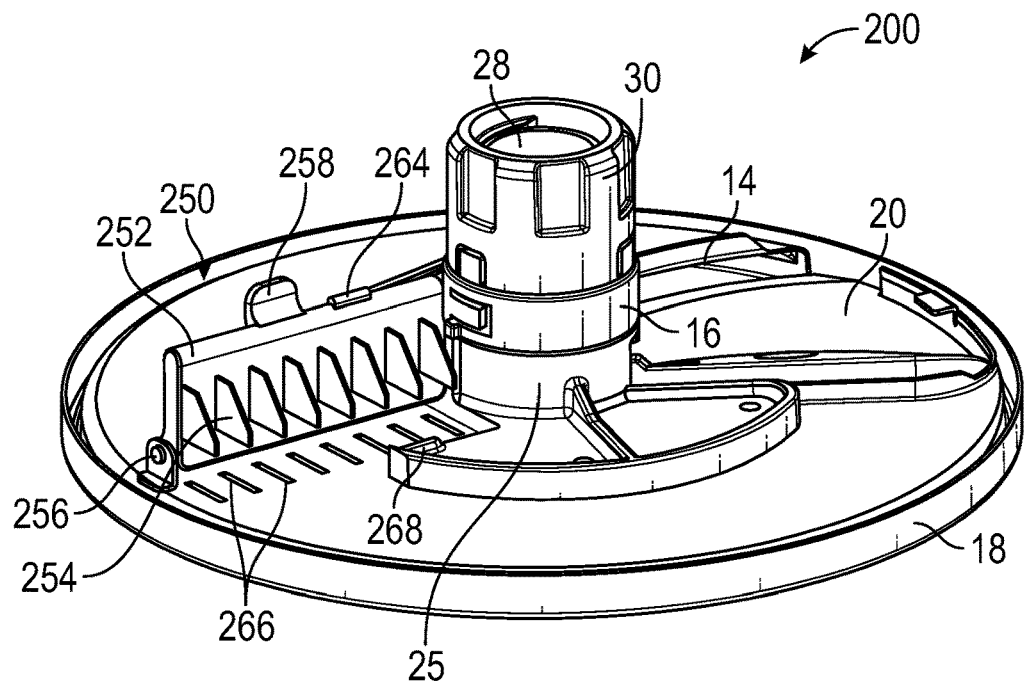
FIG. 27 is a bottom perspective view of the food slicing disc of FIG. 25, showing the vertical assembly in the retracted position.

As best shown in FIG. 27, the vertical blade assembly 250 further includes at least one, and preferably a pair of, opposed mounting brackets 270 affixed to the underside surface of the disc body 12, to which the body portion 252 of the vertical blade assembly 250 is rotatably coupled. In particular, the opposed mounting pins or projections 256 may be received in corresponding openings in the mounting brackets 270, for rotation of the body 252 about an axis extending through the mounting pins 256.

Figure 26:
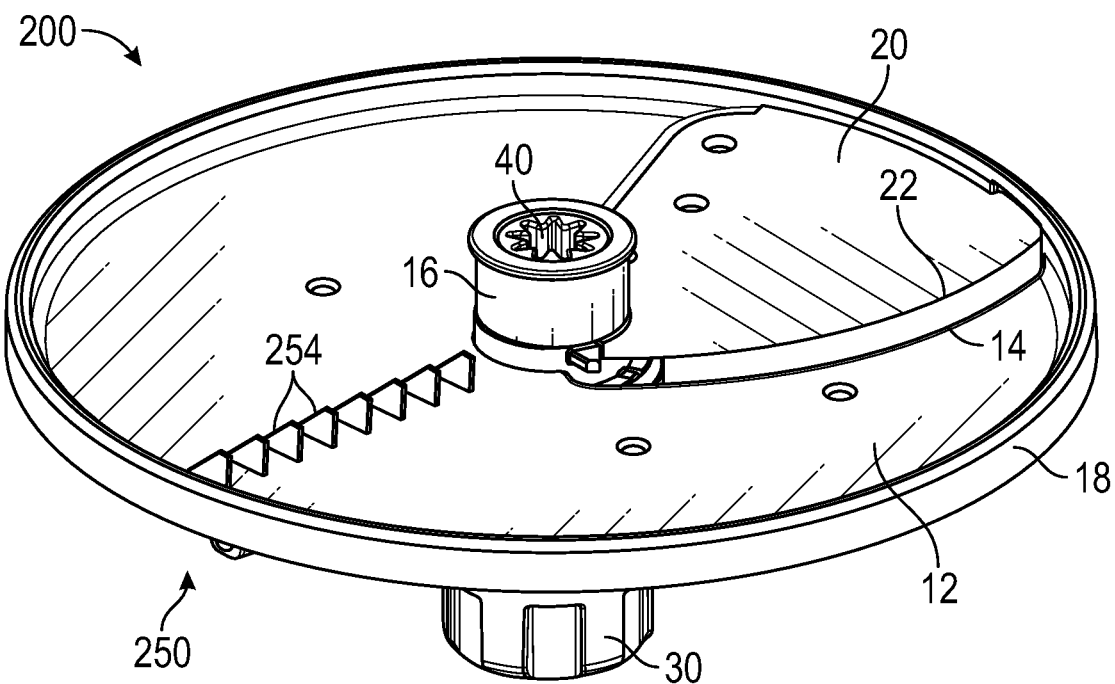
FIG. 26 is a top perspective view of the food slicing disc of FIG. 25, showing the vertical assembly in an extended position.
Figure 28:
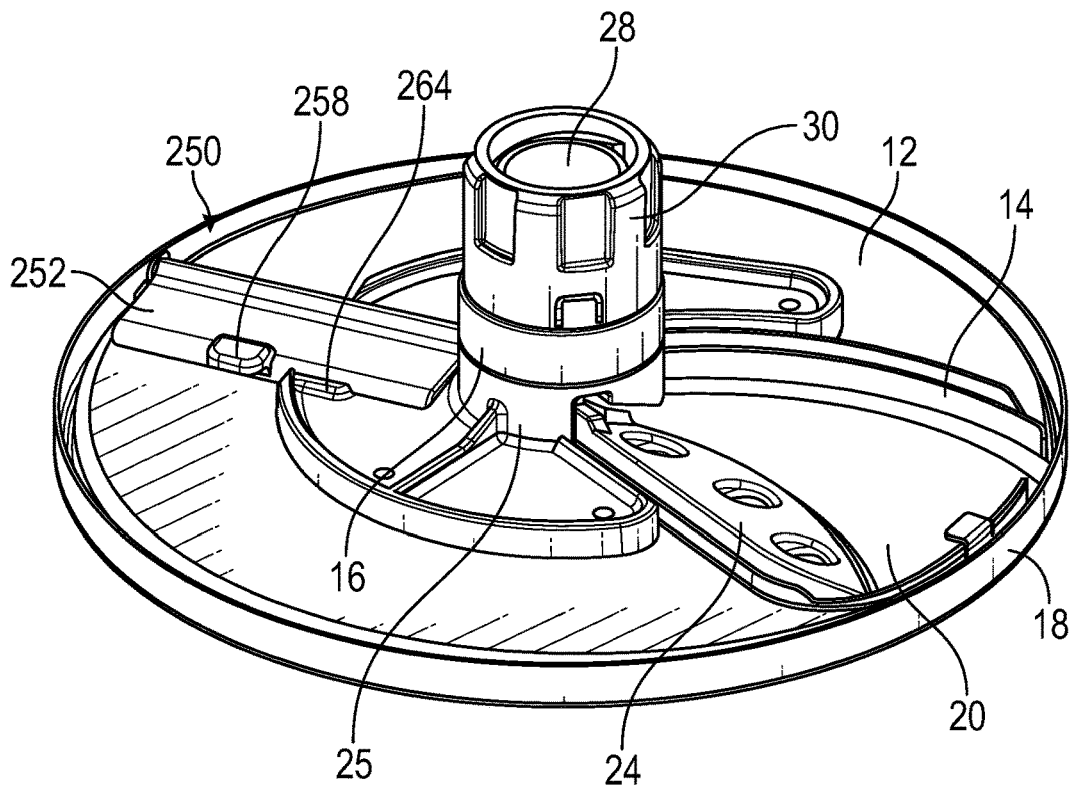
FIG. 28 is a bottom perspective view of the food slicing disc of FIG. 25, showing the vertical assembly in the extended position.

In use, the body portion 252 of the vertical blade assembly 250, by using the lever 258, is selectively rotatable about the projections 256 between a first position, where the vertical blades 254 do not extend through the slots 266 in the disc body 12 (FIGS. 25 and 27), and a second position, where the vertical blades 254 extend through the disc body 12 to vertically slice or shred food items (FIGS. 26 and 28). With reference to FIGS. 27-29, in an embodiment, the body portion 252 of the vertical blade assembly 250 also includes a retention mechanism, in the form of a pin or convex projection 264 located along the lower edge of the body portion 252. The retention projection 264 is configured to frictionally engage a corresponding groove or seat 268 in one of the support arms 26 attached to the underside of the disc body 12 to retain the vertical blade assembly 250 in the extended position. Once in the extended position, the blade assembly 250 can be easily disengaged (and moved to the retracted position), by exerting a rotational force using the lever 258 sufficient to overcome the frictional engagement between the pin 264 and the seat 268.

Similar to the embodiments disclosed above, there food slicing disc can be utilized to produced horizontal slices of food items of various thickness using the adjustable, horizontal slicing blade 20, as well as to julienne or shred good items using the adjustable vertical blade assembly 250 in combination with the horizontal slicing blade 20.

Referring now to FIGS. 31-42, a rotatable food slicing disc 300 according to another embodiment of the present invention is illustrated. The food slicing disc 300 is generally similar to slicing discs 10 and 100, where like reference numerals designate like parts. In particular, similar to slicing discs 10, 100 slicing disc 300 includes an horizontal slicing blade 20 that is adjustable using sleeve 30 to vary the horizontal slice thickness of food items. The slicing disc 300 also includes a vertical blade assembly 350 that is moveable between a retracted position where vertical slicing blades of the assembly 350 are moved to a position where they are not capable of interacting with a food item, and one or more deployed or extended position where the blades are positioned so as to create vertical slices in a food item, as discussed hereinafter.

As best shown in FIGS. 38-41, the vertical blade assembly 350 includes a generally triangularly-shaped body portion 352 having rectangular-shaped sides defining a first outwardly facing flat surface 354, a second outwardly facing surface 356 having a first array of horizontally-spaced, vertical slicing blades 358 extending therefrom, and a third outwardly facing surface 360 having a second array of horizontally-spaced, vertical slicing blades 362 extending therefrom. In an embodiment, the plurality of blades 358 of the first array are relatively closely spaced from one another, for the fine shredding of food items, as discussed below. In contrast, the plurality of blades 362 of the second array are relatively widely spaced from one another (at least compared to the spacing of the blades 358), for the coarse shredding of food items, as discussed below.

As also shown therein, the body portion 352 includes a pair of opposed mounting pins 364 or axles extending from opposed ends thereof about which the body portion 352 may rotate, as discussed hereinafter. The body portion 352 also includes a lever 366 that is fixedly connected to one of the mounting pins 364 that can be manipulated by a user to rotate the body portion 352 about an axis defined by the mounting pin 364, as well as a position stop in the form of a projection or detent 368 at one end of the body portion 352. Importantly, in an embodiment, the mounting pin 364 with which the lever 366 is associated is slidably connected to the body portion 352 and includes a compression spring or coil spring 365. Accordingly, the mounting pin 364 and lever 366 are moveable axially inward against the bias of the spring 365, the purpose of which is discussed hereinafter.

Figure 38:
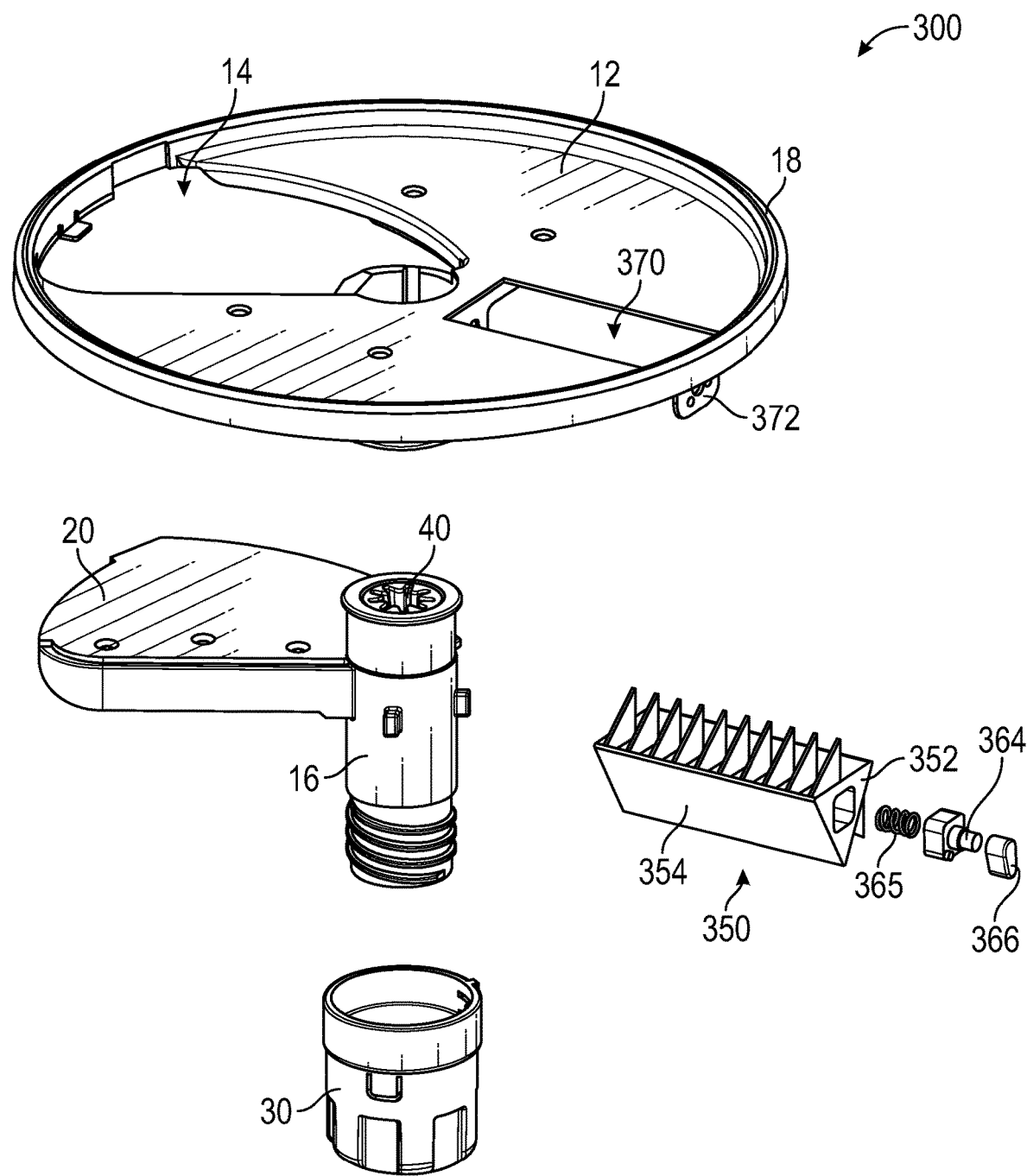
FIG. 38 is an exploded, perspective view of the food slicing disc of FIG. 31.
Figure 39:
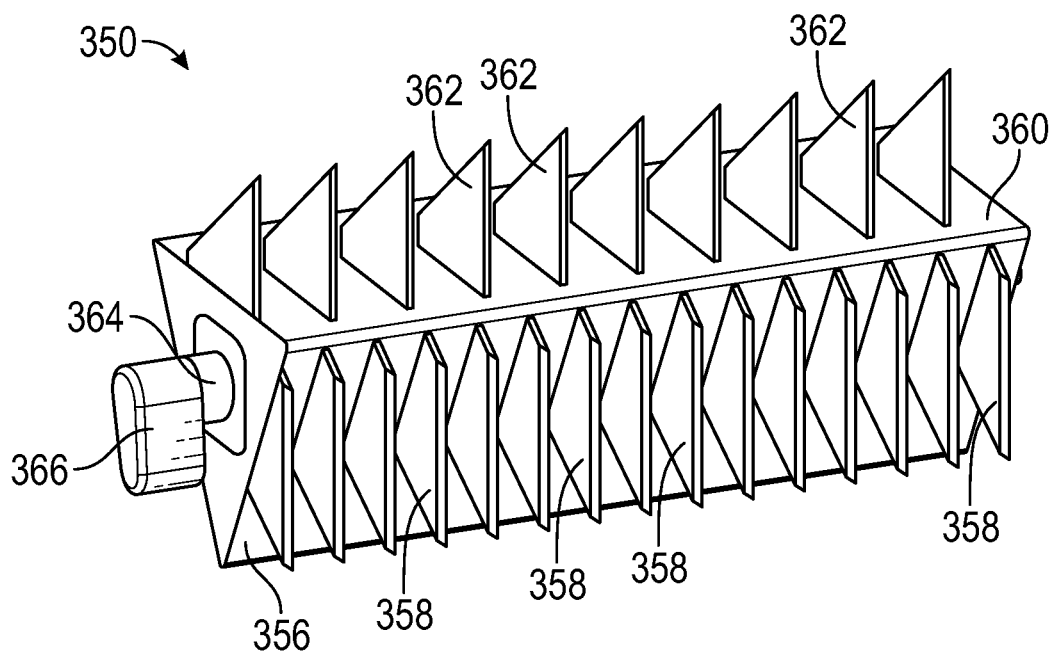
FIG. 39 is a perspective view of the vertical blade assembly of the food slicing disc of FIG. 31.
Figure 40:
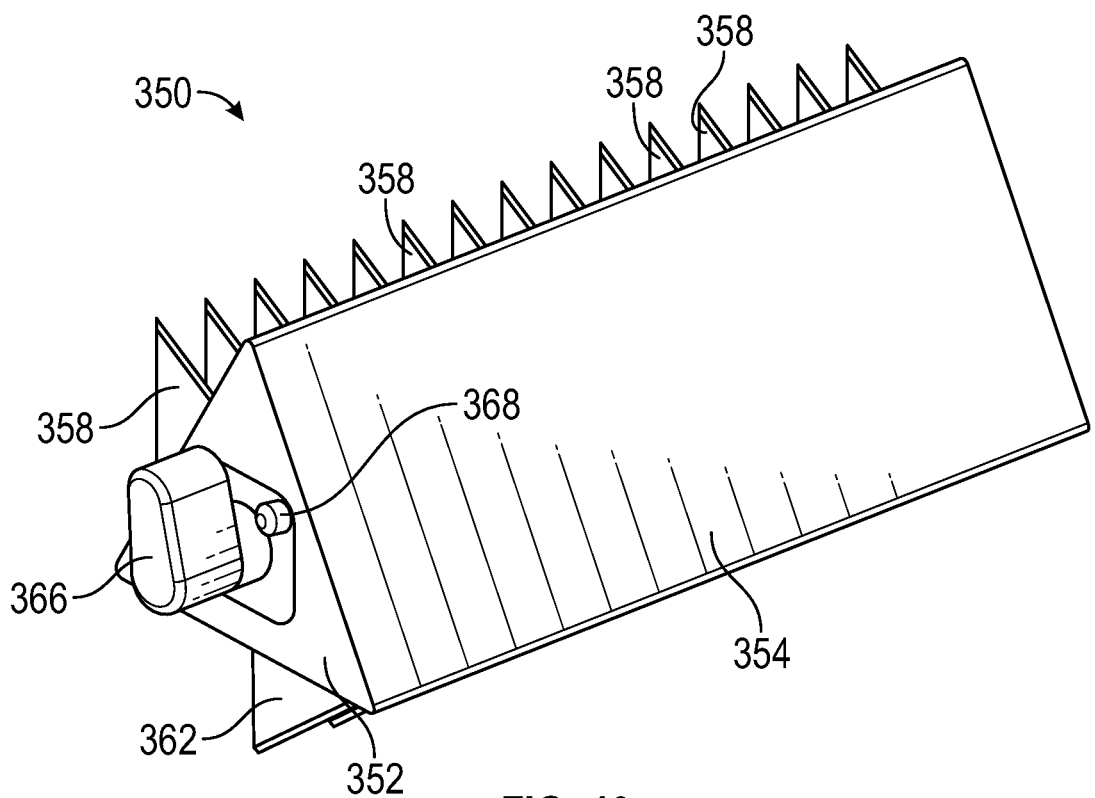
FIG. 40 is another perspective view of the vertical blade assembly of the food slicing disc of FIG. 31.
Figure 41:
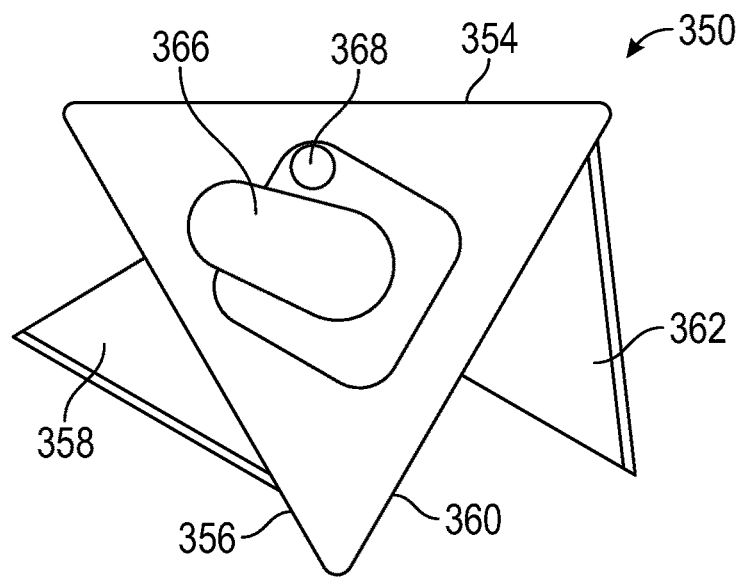
FIG. 41 is an end elevational view of the vertical blade assembly of the food slicing disc of FIG. 31.
Figure 42:
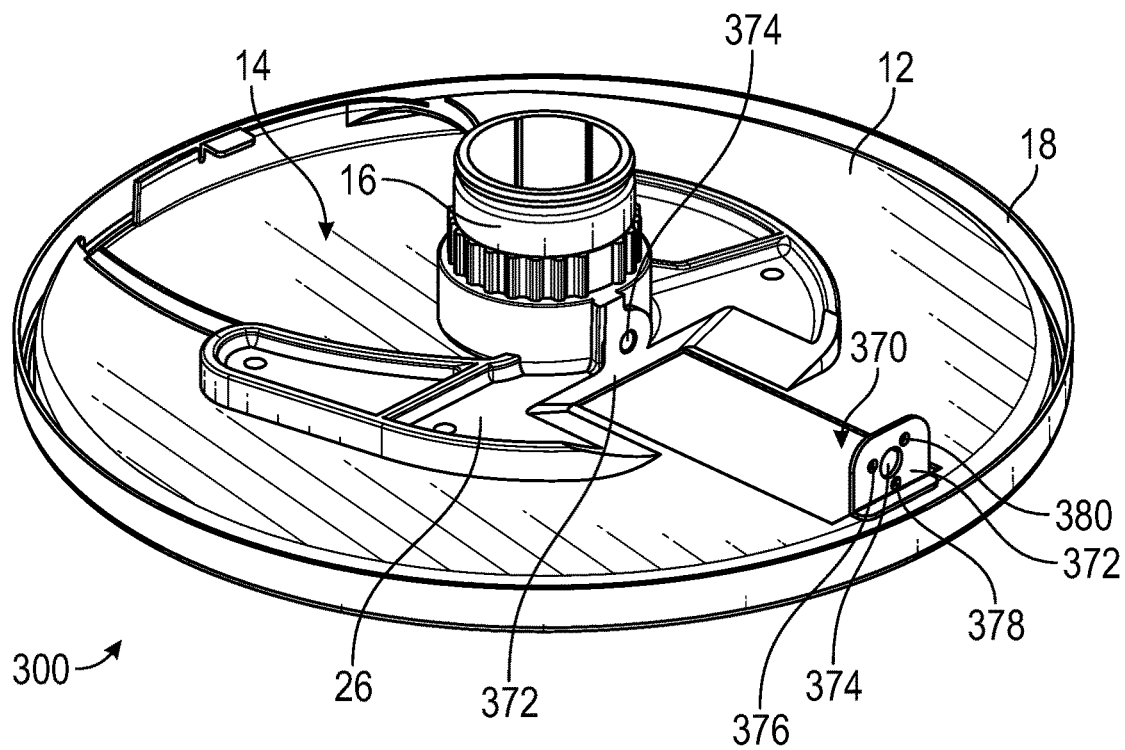
FIG. 42 is a bottom perspective view of a portion of the food slicing disc of FIG. 31.

With reference to FIG. 38, the disc body 12 is formed with an opening 370 that corresponds in size and shape to the sides of the body portion 352 of the vertical blade assembly 350. In an embodiment, the opening 370 is rectangular and is positioned opposite opening 14 with which the horizontal slicing blade 20 is associated. The vertical blade assembly 350 further includes at least one, and preferably a pair of, opposed mounting brackets 372 having an aperture 374 forming a cradle within which the opposed mounting pins 364 are rotatably mounted. The mounting brackets 372 are fixedly secured to the underside surface of the disc body 12. In particular, the opposed mounting pins 364 may be received in corresponding openings 374 in the mounting brackets 372, for mounting of the body portion 352 to the disc body 12, and for rotation of the body portion 352 about an axis extending through the mounting pins 364.

In operation, the slicing disc 20 is adjustable to vary the slice thickness of food items, in the manner described above. In addition, the vertical blade assembly 350 is rotatable using lever 366 to selectively position either the flat side 354, fine shredding side 356, or coarse shredding side 360 of the vertical slicing assembly body portion 352 in alignment with the opening 370 in the disc body 12. Importantly, the outboard mounting bracket 364 includes three locating apertures 376, 378, 380 corresponding to the three positions of the body 362 with respect to the opening 370 in the disc body 12. The locating apertures 376, 378, 380 are configured to receive the detent 368 to retain the body portion 352 in the desired slicing/shredding (or non-shredding) position.

Figure 31:
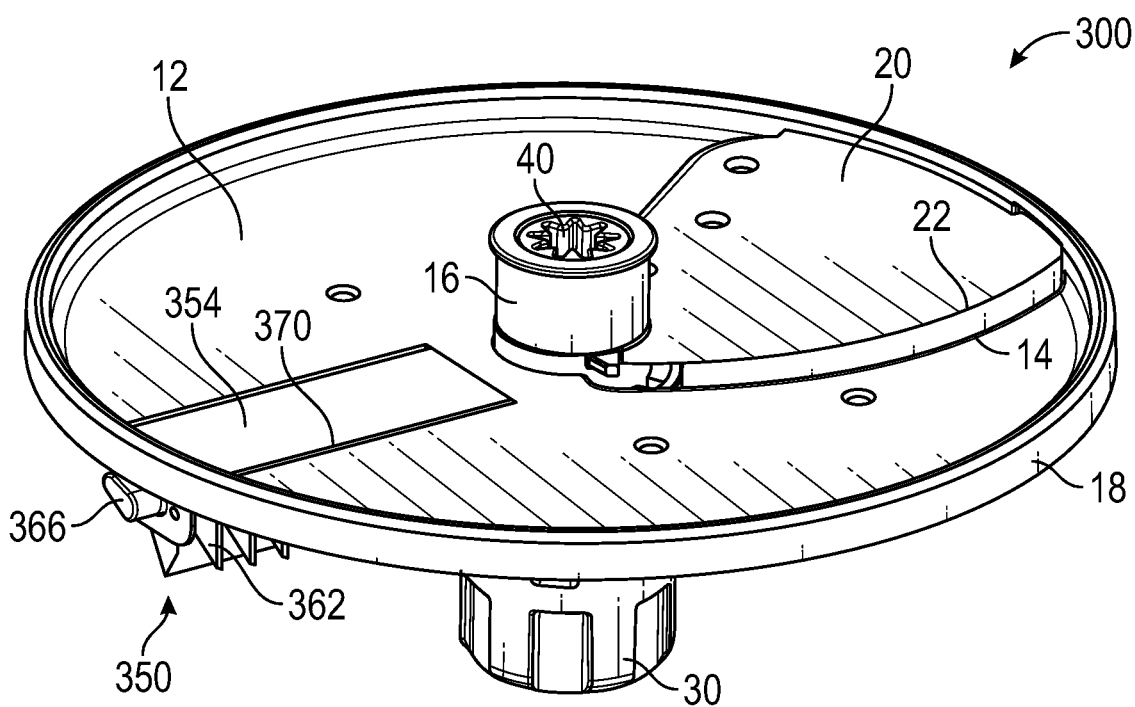
FIG. 31 is a top perspective view of a food slicing disc for a food processing device, according to another embodiment of the present invention, showing a vertical blade assembly thereof in a retracted position.
Figure 32:
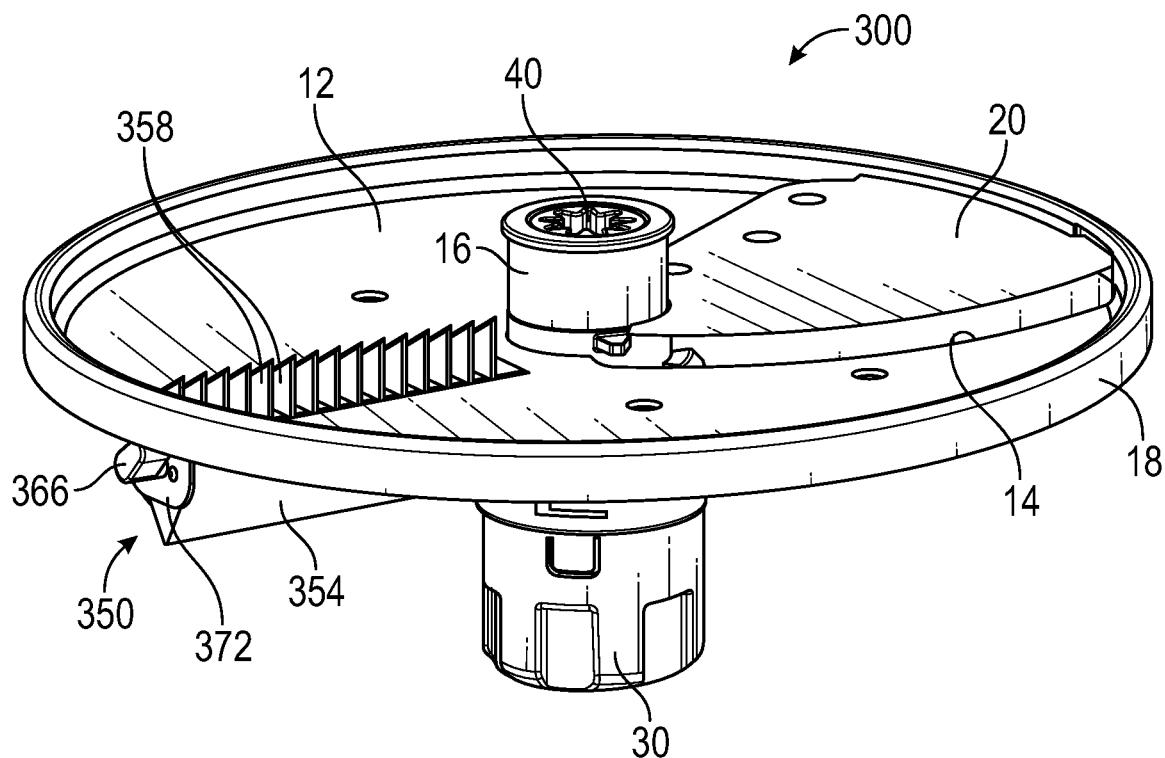
FIG. 32 is a top perspective view of the food slicing disc of FIG. 31, showing the vertical blade assembly in a fine slicing position.
Figure 33:
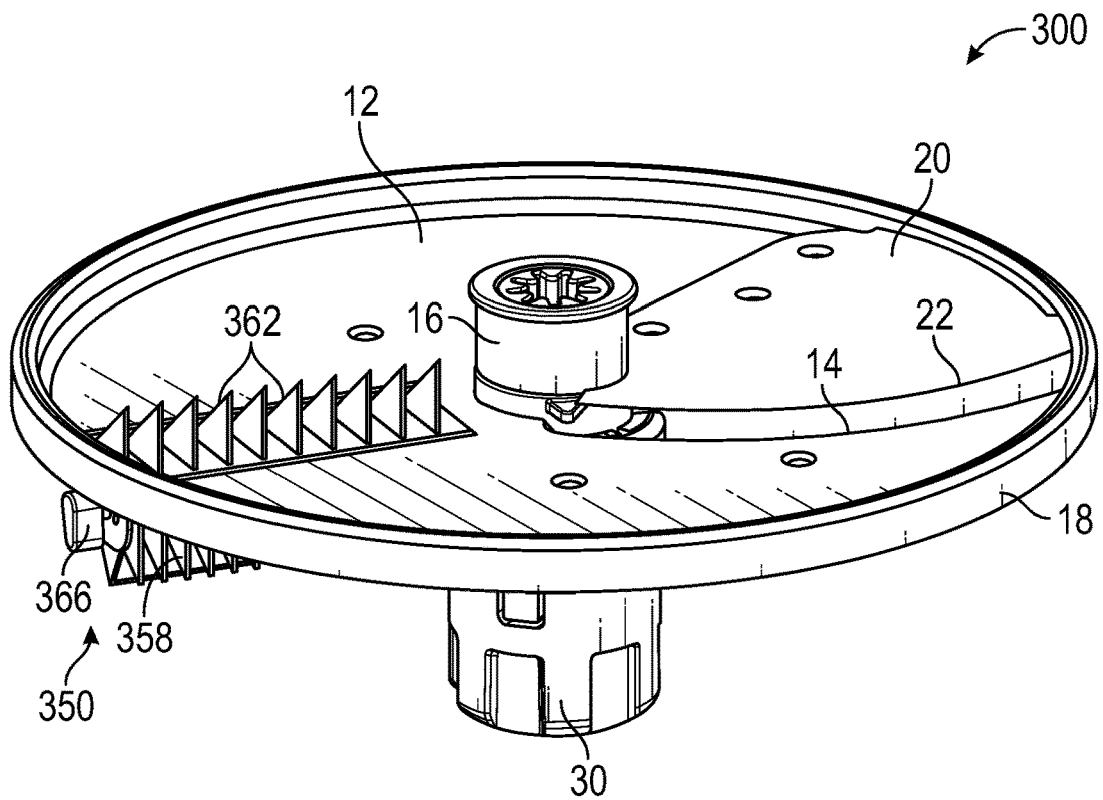
FIG. 33 is a top perspective view of the food slicing disc of FIG. 31, showing the vertical blade assembly in a coarse slicing position.
Figure 34:
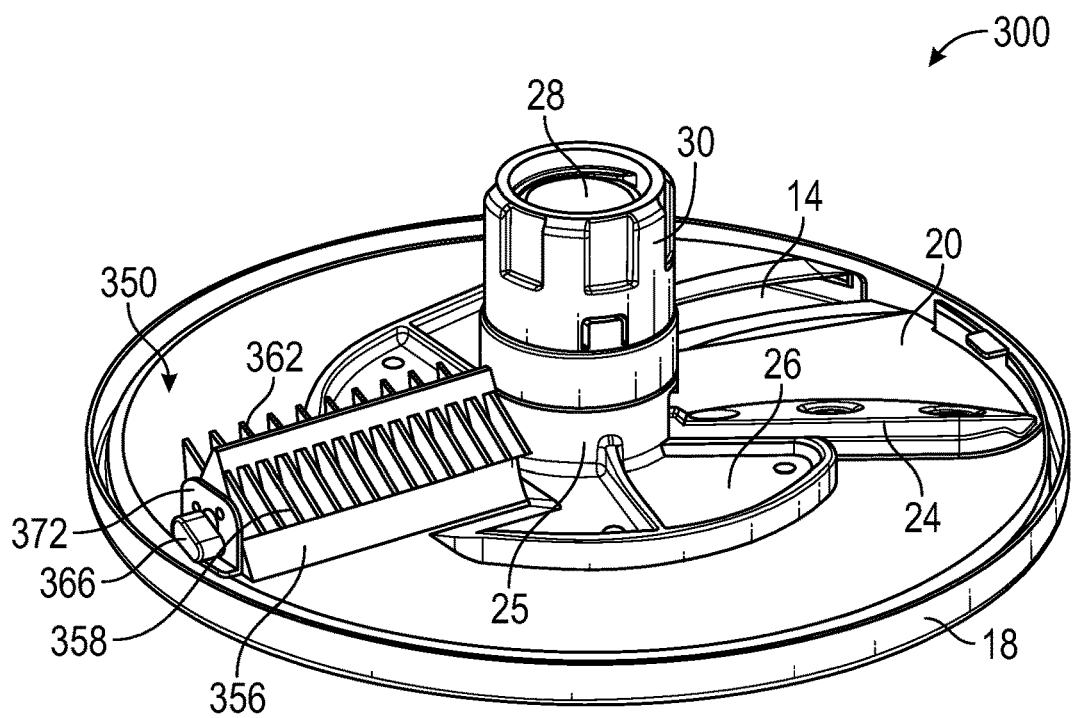
FIG. 34 is a bottom perspective view of the food slicing disc of FIG. 31, showing the vertical assembly in the retracted position.
Figure 35:
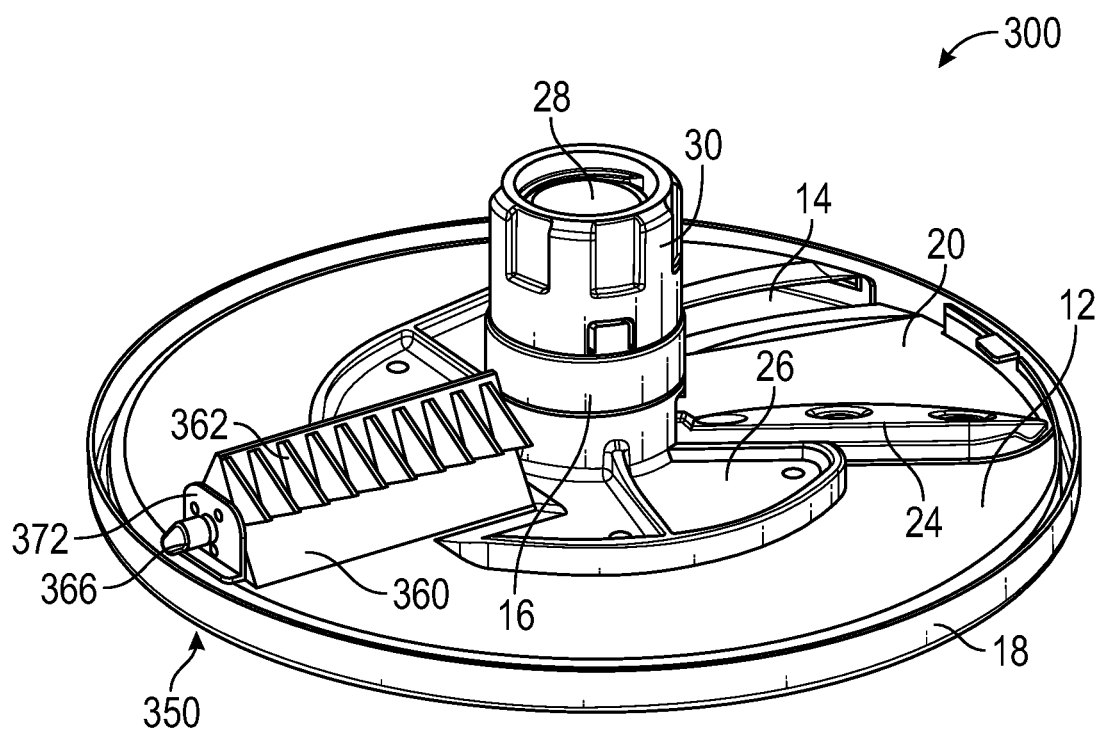
FIG. 35 is a bottom perspective view of the food slicing disc of FIG. 31, showing the vertical blade assembly in the fine slicing position.
Figure 36:
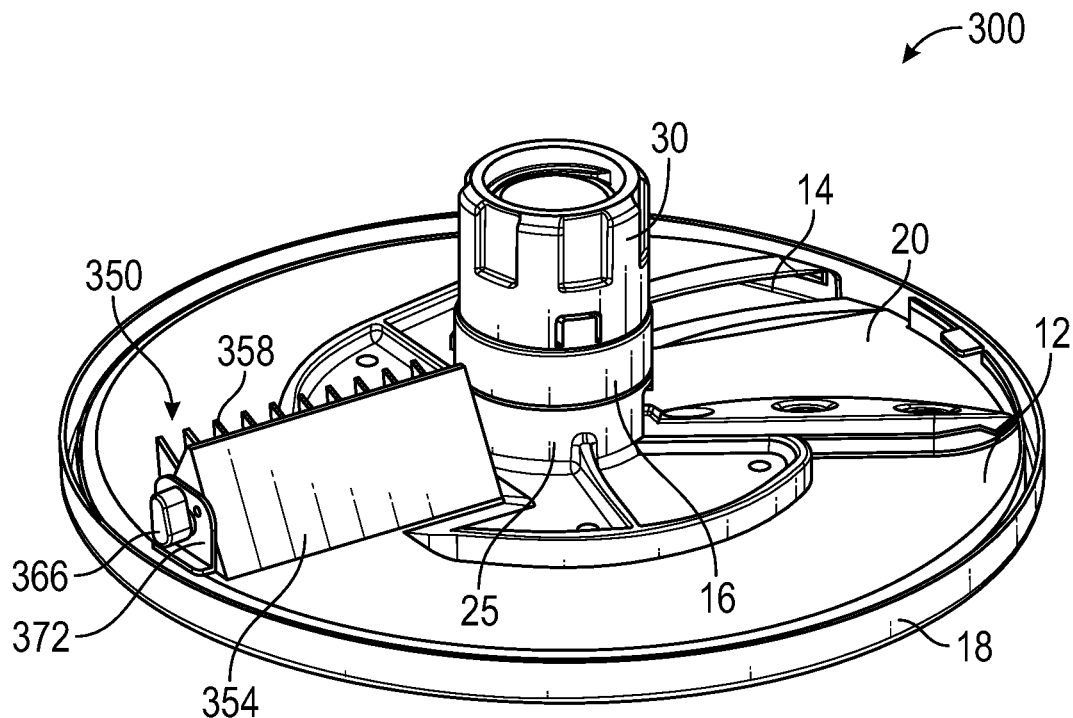
FIG. 36 is a bottom perspective view of the food slicing disc of FIG. 31, showing the vertical blade assembly in the coarse slicing position.
Figure 37:
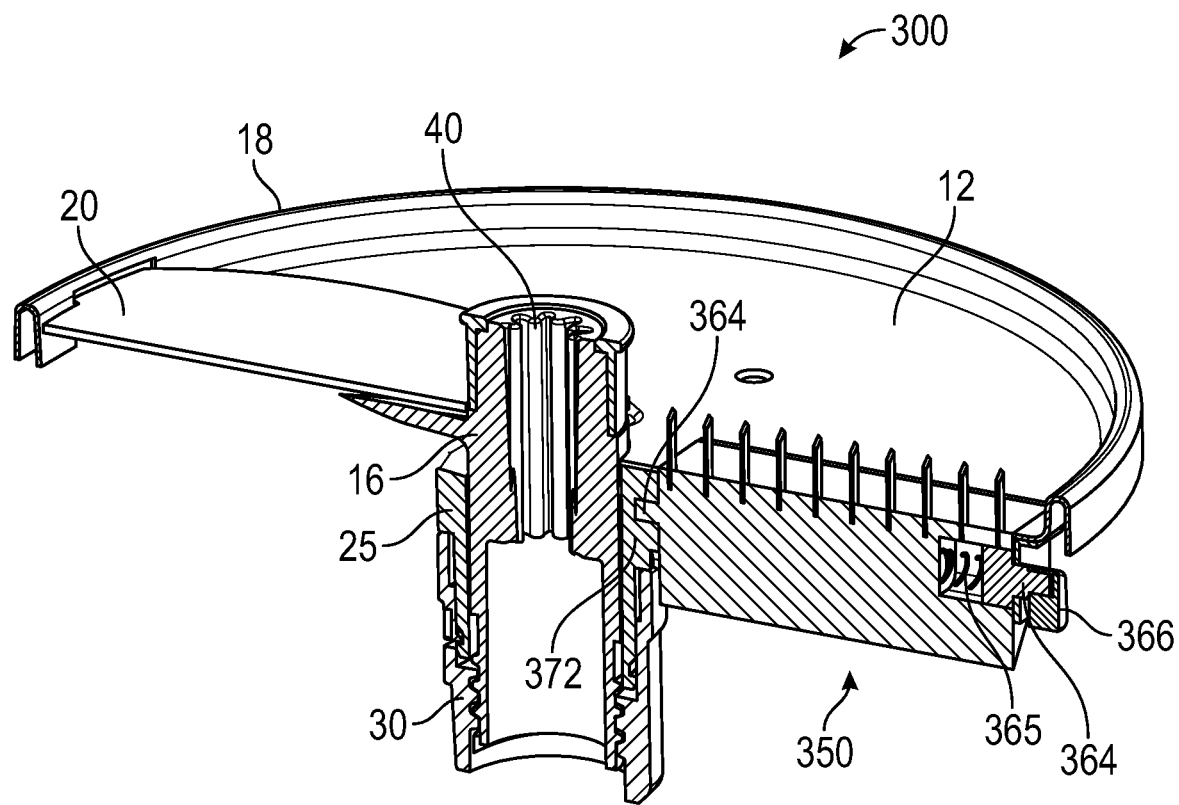
FIG. 37 is a cross-sectional view of the food slicing disc of FIG. 31.

For example, as shown in FIGS. 31 and 34, the body portion 352 is rotatable, using lever 366, to a first position where the flat side surface 354 of the body is in registration with the opening 370. In this position, the detent or projection 368 is received in locating/retaining aperture 378, which retains the rotational position of the body portion 352. In such position, the horizontal slicing blade 20 slices food items horizontally. As the flat surface 354 of the vertical blade assembly 350 faces the opening 370 in the disc body 12, vertical slicing is not carried out.

To coarsely shred food items, the body portion 352 is rotated so that the coarse shredding surface 360 is aligned with the opening 370 in the disc body 12, and so that the coarse shredding blades 362 extend upwardly through the opening 370 and above the upper surface of the disc body 12. This is accomplished by pushing the lever 366 axially inward against the bias of the spring 365 to unseat the projection 368 from the aperture/recess 378, and then rotating the body portion 352 using the lever 366. When the coarse shredding position is reached, the lever 366 can be released, causing the spring 365 to bias the projection 368 radially outward and into aperture/recess 380. This engagement between the projection 368 and recess 380 retains the vertical blade assembly 350 in the coarse shredding position. In this position, the blades 362 function to slice a food item vertically, and then the horizontal slicing blade 20 functions to slice the food item horizontally, causing the strips or shreds of food items to fall through opening 14 into a processing container within which the food slicing blade 300 is positioned.

To finely shred food items, the body portion 352 is rotated so that the fine shredding surface 356 is aligned with the opening 370 in the disc body 12, and so that the fine shredding blades 358 extend upwardly through the opening 370 and above the upper surface of the disc body 12. This is accomplished by pushing the lever 366 axially inward against the bias of the spring 365 to unseat the projection 368 from the aperture/recess 380, and then rotating the body portion 352 using the lever 366. When the fine shredding position is reached, the lever 366 can be released, causing the spring 365 to bias the projection 368 radially outward and into aperture/recess 376. This engagement between the projection 368 and recess 376 retains the vertical blade assembly 350 in the fine shredding position. In this position, the blades 358 function to slice a food item vertically, and then the horizontal slicing blade 20 functions to slice the food item horizontally, causing the strips or shreds of food items to fall through opening 14 into a processing container within which the food slicing blade 300 is positioned.

While the vertical slicing assembly 300 has been described as having a body portion 352 of a triangular shape and having three sides (and two different vertical slicing blade arrangements, for coarse shredding and fine shredding, respectively), the present invention is not intended to be so limited in this regard. In particular, the body portion 352 may have more than three sides having various blade and/or grating element arrangements to provide for an increased level of control over the slicing/grating operation (to provide different levels of fineness or coarseness). In addition, it is contemplated that the body portion 352 may have both a vertical slicing face (with upstanding vertical slicing blades), as well as a grating face.

The embodiments of the present invention disclosed herein therefore provide a food slicing disc having an adjustable horizontal slicing blade and an adjustable vertical slicing blade assembly for processing of food items in a variety of manners. By providing adjustable horizontal and vertical slicing blades, slice thickness can be varied, as can the width of julienne slices or gratings produced. The present invention therefore provides for a level of control over the processing operations heretofore not seen in the art.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A rotatable slicing disc assembly for use with an electrically powered food processor appliance, comprising:
    a disc body having a top surface, a bottom surface, a central hub, a circumferential edge, a first opening in the disc body between the central hub and the circumferential edge, and a second opening in the disc body between the central hub and the circumferential edge;
    an adjustable horizontal slicing blade associated with the first opening, the horizontal slicing blade being moveable in a direction perpendicular to the top surface of the disc body to vary a gap between the horizontal slicing blade and the top surface of the disc body; and
    an adjustable vertical blade assembly associated with the second opening, the vertical blade assembly being moveable between a first position where a slicing element of the vertical blade assembly is located below a plane defined by the top surface of the disc body, and a second position where the slicing element of the vertical blade assembly extends above the plane defined by the top surface of the disc body.

2. The slicing disc assembly of claim 1, wherein:
    the horizontal slicing blade and the vertical blade assembly are operatively connected to one another such that movement of the horizontal slicing blade with respect to the top surface of the disc body causes a corresponding movement of the vertical blade assembly.

3. The slicing disc assembly of claim 1, wherein:
    the slicing element includes a plurality of grating elements.

4. The slicing disc assembly of claim 1, wherein:
    the second opening includes a plurality of slots; and
    wherein the slicing element includes a plurality of blades corresponding to the plurality of slots.

5. The slicing disc assembly of claim 4, wherein:
    the plurality of blades are fixedly connected to a rotatable shaft mounted adjacent to the bottom surface of the disc body; and
    wherein the vertical blade assembly includes a lever connected to the rotatable shaft for moving the vertical blade assembly between the first position and the second position.

6. The slicing disc assembly of claim 5, wherein:
    the lever includes a retention mechanism configured to retain the vertical blade assembly in the first position and/or the second position.

7. The slicing disc assembly of claim 1, wherein:
    the vertical blade assembly includes a body portion having a first face having a flat surface, and a second face having a first plurality of blades extending perpendicularly from the second face.

8. The slicing disc assembly of claim 7, wherein:
    the body portion is rotatable such that in the first position, the first face is in registration with the second opening, and in the second portion, the second face is in registration with the second opening.

9. The slicing disc assembly of claim 7, wherein:
    the body portion includes a third face having a second plurality of blades extending perpendicularly from the third face;
    wherein the first plurality of blades are spaced from one another by a first distance; and
    wherein the second plurality of blades are spaced from one another by a second distance;
    wherein the first distance is less than the second distance.

10. The slicing disc assembly of claim 9, wherein:
    the body portion is rotatable to selectively position one of the first face, the second face or the third face in registration with the opening to provide for no vertical slicing of a food item, fine shredding of the food item, or coarse shredding of the food item, respectively.

11. The slicing disc assembly of claim 9, wherein:
    the body portion includes a retention mechanism configured to maintain the body portion in a selected rotational position.

12. The slicing disc assembly of claim 11, wherein:
    the retention mechanism includes a spring-biased projection that is configured to engage one of a plurality of recesses in a mounting bracket of the vertical slicing assembly.

13. A method of operating a food processing device having a collection container, a slicing disc received atop the collection container, and a lid received atop the slicing disc, the method comprising the steps of:
    adjusting a position of a horizontal slicing blade associated with a first opening in the slicing disc with respect to a plane defined by a top surface of the slicing disc; and
    rotating a vertical slicing blade assembly associated with a second opening in the slicing disc from a first position where a slicing element of the vertical slicing blade assembly is located below the plane defined by the top surface of the slicing disc, and a second position where the slicing element of the vertical slicing blade assembly extends above the plane defined by the top surface of the slicing disc.

14. The method according to claim 13, wherein:
    the slicing element includes a first plurality of blades spaced apart from one another by a first distance;
    the vertical slicing blade assembly includes a second slicing element having a second plurality of blades spaced apart from one another by a second distance, the second distance being greater than the first distance; and
    wherein the method further includes the step of rotating the vertical slicing blade assembly to a third position where the second slicing element and the second plurality of blades thereof extend above the plane defined by the top surface of the slicing disc.

15. The method according to claim 14, wherein:
    the first plurality of blades are grating blade elements.

16. The method according to claim 13, further comprising the step of:
    rotating the vertical slicing blade assembly from the first position to the second position includes disengaging a detent retention mechanism by depressing a lever of the vertical slicing blade assembly in a radial direction of the slicing disc against a spring bias.

17. The method according to claim 13, wherein:
    the step of adjusting the position of the horizontal slicing blade causes a corresponding and simultaneous movement of the vertical blade assembly.

18. A rotatable slicing disc assembly for use with an electrically powered food processor appliance, comprising:
    a disc body having a top surface, a bottom surface, a central hub, a circumferential edge, a first opening in the disc body between the central hub and the circumferential edge, and a second opening in the disc body between the central hub and the circumferential edge;
    an adjustable horizontal slicing blade associated with the first opening, the horizontal slicing blade being moveable in a direction perpendicular to the top surface of the disc body to vary a gap between the horizontal slicing blade and the top surface of the disc body; and an adjustable vertical blade assembly associated with the second opening, the vertical blade assembly being moveable between a first position where a flat surface of the vertical blade assembly is in registration with the second opening to provide for only horizontal slicing of a food item, a second position where a plurality of coarse shredding elements of the vertical blade assembly are in registration with the second opening and extend therethrough and above the top surface of the disc body to provide for coarse shredding of the food item, and a third position where a plurality of fine shredding elements of the vertical blade assembly are in registration with the second opening and extend therethrough and above the top surface of the disc body to provide for fine shredding of the food item.

19. The slicing disc assembly of claim 18, wherein:

the vertical blade assembly includes a retention mechanism configured to maintain the vertical blade assembly in the first position, second position or third position.

20. The slicing disc assembly of claim 19, wherein:

the retention mechanism includes a spring-biased projection that is configured to engage one of a plurality of recesses in a mounting bracket of the vertical slicing assembly.

* * * * *